US006983330B1

United States Patent
Oliveira et al.

(10) Patent No.: US 6,983,330 B1
(45) Date of Patent: Jan. 3, 2006

(54) METHOD AND APPARATUS FOR USING MULTIPLE PATHS FOR PROCESSING OUT OF BAND COMMANDS

(75) Inventors: Fred Oliveira, Sudbury, MA (US); Matthew J. D'Errico, Southborough, MA (US); Kevin Rodgers, Derry, NH (US)

(73) Assignee: EMC Corporation, Hopkinton, MA (US)

( * ) Notice: Subject to any disclaimer, the term of this patent is extended or adjusted under 35 U.S.C. 154(b) by 0 days.

(21) Appl. No.: 09/474,607

(22) Filed: Dec. 29, 1999

(51) Int. Cl.
  *G06F 15/16* (2006.01)
  *G06F 15/173* (2006.01)
  *G06F 11/00* (2006.01)
  *G06F 9/44* (2006.01)
  *H03K 17/00* (2006.01)
  *H04Q 11/00* (2006.01)

(52) U.S. Cl. .................. 709/239; 709/235; 709/241; 370/228; 370/365; 370/395.21; 370/395.32; 370/395.72; 370/469; 714/1; 340/825.01; 340/2.1; 340/2.23; 719/318; 719/320

(58) Field of Classification Search ............. 709/215, 709/211, 217, 200, 212, 213, 214, 216, 230, 709/231, 232, 235, 203, 219, 238–244; 370/225–228, 370/351, 364–365, 395.32, 469–472; 714/1, 714/8; 340/825.01, 2.1, 2.23; 719/318, 719/320–322, 324–326
See application file for complete search history.

(56) References Cited

U.S. PATENT DOCUMENTS

| | | | | |
|---|---|---|---|---|
| 4,577,272 A | * | 3/1986 | Ballew et al. ............ | 714/15 |
| 5,519,641 A | * | 5/1996 | Beers et al. ............ | 709/208 |
| 5,684,956 A | * | 11/1997 | Billings ............ | 709/219 |
| 5,828,835 A | * | 10/1998 | Isfeld et al. ............ | 709/200 |
| 5,860,137 A | * | 1/1999 | Raz et al. ............ | 711/202 |
| 5,867,736 A | * | 2/1999 | Jantz ............ | 710/74 |
| 5,892,923 A | * | 4/1999 | Yasuda et al. ............ | 709/239 |
| 5,905,872 A | * | 5/1999 | DeSimone et al. ......... | 709/245 |
| 5,935,232 A | * | 8/1999 | Lambrecht et al. ......... | 710/315 |
| 6,038,621 A | * | 3/2000 | Gale et al. ............ | 710/56 |
| 6,081,844 A | * | 6/2000 | Nowatzyk et al. ......... | 709/233 |

(Continued)

OTHER PUBLICATIONS

"Virtual Interface Architecture Specification" from Compaq, Intel and Microsoft, Version 1.0, Dec. 16, 1997.*

(Continued)

*Primary Examiner*—Rupal Dharia
*Assistant Examiner*—Melvin H. Pollack
(74) *Attorney, Agent, or Firm*—Wolf, Greenfield & Sacks, P.C.

(57) ABSTRACT

One aspect is directed to a method and apparatus for transferring information, through a shared storage system, between first and second processes running on first and second computers, respectively. Both computers are coupled to a data storage system, with the first computer being coupled through multiple paths. In accordance with one aspect of the invention, at least one of the multiple paths is selected through which to transfer the information between the first process and the data storage system, so that communication between the first process and the shared storage system is not constrained to any particular path. Another aspect is directed to a method and apparatus for processing an out of band control command executed by a host computer in a multi-path system and targeting a device. A path is selected for transmitting the out of band control command to the device based upon a selection criteria that enables the selected path to be other than a specific target path identified by the out of band control command.

22 Claims, 16 Drawing Sheets

U.S. PATENT DOCUMENTS

| | | | | |
|---|---|---|---|---|
| 6,081,848 A * | 6/2000 | Grun et al. | | 710/1 |
| 6,085,253 A * | 7/2000 | Blackwell et al. | | 709/235 |
| 6,108,684 A * | 8/2000 | DeKoning et al. | | 718/105 |
| 6,119,244 A * | 9/2000 | Schoenthal et al. | | 714/4 |
| 6,145,028 A * | 11/2000 | Shank et al. | | 710/31 |
| 6,170,023 B1 * | 1/2001 | Beardsley et al. | | 710/36 |
| 6,173,306 B1 * | 1/2001 | Raz et al. | | 718/102 |
| 6,185,601 B1 * | 2/2001 | Wolff | | 709/203 |
| 6,192,399 B1 * | 2/2001 | Goodman | | 725/78 |
| 6,216,202 B1 * | 4/2001 | D'Errico | | 711/112 |
| 6,240,462 B1 * | 5/2001 | Agraharam et al. | | 709/238 |
| 6,289,389 B1 * | 9/2001 | Kikinis | | 709/239 |
| 6,308,282 B1 * | 10/2001 | Huang et al. | | 714/4 |
| 6,327,248 B1 * | 12/2001 | Hosokawa et al. | | 370/235 |
| 6,336,177 B1 * | 1/2002 | Stevens | | 711/170 |
| 6,359,894 B1 * | 3/2002 | Hong et al. | | 370/402 |
| 6,363,051 B1 * | 3/2002 | Eslambolchi et al. | | 370/225 |
| 6,373,838 B1 * | 4/2002 | Law et al. | | 370/352 |
| 6,377,992 B1 * | 4/2002 | Plaza Fernandez et al. | | 709/227 |
| 6,378,039 B1 * | 4/2002 | Obara et al. | | 711/114 |
| 6,385,198 B1 * | 5/2002 | Ofek et al. | | 370/389 |
| 6,389,462 B1 * | 5/2002 | Cohen et al. | | 709/218 |
| 6,393,484 B1 * | 5/2002 | Massarani | | 709/227 |
| 6,415,364 B1 * | 7/2002 | Bauman et al. | | 711/155 |
| 6,434,656 B1 * | 8/2002 | Downer et al. | | 710/316 |
| 6,457,139 B1 * | 9/2002 | D'Errico et al. | | 714/5 |
| 6,466,985 B1 * | 10/2002 | Goyal et al. | | 709/238 |
| 6,470,397 B1 * | 10/2002 | Shah et al. | | 709/250 |
| 6,473,803 B1 * | 10/2002 | Stern et al. | | 709/238 |
| 6,487,177 B1 * | 11/2002 | Weston-Dawkes | | 370/254 |
| 6,487,622 B1 * | 11/2002 | Coskrey et al. | | 710/241 |
| 6,487,628 B1 * | 11/2002 | Duong et al. | | 710/313 |
| 6,542,507 B1 * | 4/2003 | Khacherian et al. | | 370/395.43 |
| 6,549,934 B1 * | 4/2003 | Peterson et al. | | 709/203 |
| 6,567,857 B1 * | 5/2003 | Gupta et al. | | 709/238 |
| 6,574,224 B1 * | 6/2003 | Brueckheimer et al. | | 370/395.6 |
| 6,625,156 B2 * | 9/2003 | Shaio et al. | | 370/395.21 |
| 6,625,158 B1 * | 9/2003 | Alexander et al. | | 370/398 |
| 6,751,665 B2 * | 6/2004 | Philbrick et al. | | 709/224 |
| 6,766,359 B1 * | 7/2004 | Oliveira et al. | | 709/213 |

OTHER PUBLICATIONS

"RASSP Model Year Architecture Specification vol. IV—Standard Virtual Interface Specification Appendices" from Lockheed Martin, Nov. 25, 1996.*

"VI Architecture" homepage, from the Wayback Machine, Dec. 2, 1998.*

Garlick, Larry, "Out-of-Band Control Signals in a Host-to-Host Protocol" RFC 721, from the Network Working Group, Sep. 1, 1976.*

* cited by examiner

| Field Name | Field Usage |
|---|---|
| blk5_id | Block identifier, set to "MAS_EMC" on master device. Copies are also written to secondary devices with id set to "SEC_EMC" |
| blk5_dev_id | Entry number of master device in device table |
| blk5_seg_size | Size of transfer segment in blocks |
| blk5_version | Master Control Block structure version number |
| blk5_time_id | Creation time of master block |
| blk5_tot_seg_num | Total number of transfer segments |
| blk5_process_id_table_ptr | Pointer to start of process id table structure |
| blk5_secondary_device_entrynum | Number of entries in secondary device table |
| blk5_start_process_segment_ptr | Pointer to process segment pointer table structures |
| blk5_max_connections | Maximum number of connections allowed |
| blk5_mast_sec_start_ptr | Pointer to process segment pointer table structures |
| blk5_mast_sec_start_segment_ptr | Pointer to start of data segments |
| blk5_ptr_seg_per_process | Number of segments per process (connection) |
| blk5_maxptr | Maximum number of segments per process |
| blk5_unix_filename | UNIX file name of master device |

FIG. 4

| Field Name | Field Usage |
|---|---|
| pro_process_id | Process (connection) id (=slot number) |
| pro_flag_process | Process flag field |
| pro_con_rc | Status code |
| pro_requestor | Name of requestor (initiator) process |
| pro_requestor_password | Password for requestor process |
| pro_requestor_type | OS Type of requestor |
| pro_requestee | Name of requestee (connector) process |
| pro_requestee_type | OS Type of requestee |
| pro_dtd | Command structure for initiator to connector comm. |
| InitM | Command structure for connector to initiator comm. |

FIG. 5

| Field Name | Field Usage |
|---|---|
| sec_dev_id | Device id (from configuration file) |
| sec_str_seg_ptr | Pointer to start of data segments for the device |
| sec_seg_number_for_device | Number of data segments on the device |
| sec_start_segment_number | Segment number of first segment on device (with the first segment on the first device being segment number 1) |

*FIG. 6*

| Field Name | Field Usage |
|---|---|
| ptr_process_segment_ptr | Starting block of data segment on disk |
| ptr_process_segment_flg | Segment status flag |
| ptr_process_block_seq | Segment sequence number |
| ptr_process_req_id | Process request sequence number |
| ptr_process_blk_read | Size of segment in blocks |

*FIG. 7*

METHOD AND APPARATUS FOR USING MULTIPLE PATHS FOR PROCESSING OUT OF BAND COMMANDS

FIELD OF THE INVENTION

The present invention is directed to a method and apparatus for employing multiple paths (e.g., for load balancing and/or fault tolerance reasons) in connection with a utility for transferring information between processes on different computers through the use of an intermediate data storage system.

DESCRIPTION OF THE RELATED ART

A file transfer utility employing an intermediate data storage system is described in commonly assigned U.S. patent application Ser. No. 08/723,137, entitled A FILE TRANSFER UTILITY WHICH EMPLOYS AN INTERMEDIATE DATA STORAGE SYSTEM, filed Sep. 30, 1996, (hereafter "the FTS application") which is hereby incorporated herein by reference.

Referring to FIG. 1, the File Transfer System (FTS) described in the FTS application performs a file transfer operation between two or more host processors 12 that each is coupled to a common data storage system 14 including a shared memory 15 that is accessible to the two or, more host processors. According to FTS, a file that is available to only one of the host processors 12 can be copied or transferred, through the shared memory 15, to another storage location wherein it is available to a different one of the host processors 12. Thus, the file transfer occurs through the data storage system 14, which acts as a staging buffer and transport medium for the data. The source and destination for the transferred data each can be located within the data storage system 14. Alternatively, either or both of the source and destination for the transferred data can be located in any other storage medium. Details of how FTS can be implemented are discussed in the FTS application, significant portions of which are reproduced below.

While only a single connection 16 is shown in FIG. 1 between each of the host processors 12 and the data storage system 14, it should be understood that multiple connections can be provided between each processor and the data storage system. Multiple communication paths are typically provided in a computer system for one of two reasons. First, multiple communication paths provide some fault tolerance in the event that one of the communication paths between a host processor 12 and the data storage system 14 experiences a failure. Thus, in some computer systems, only a single communication path is operational at any particular time, but at least one additional path is provided and becomes operational if the primary path experiences a failure. Second, in other computer systems, multiple communication paths are provided to enhance system performance. In such systems, the multiple communication paths are operated simultaneously, so that multiple communication operations between a host processor 12 and the data storage system 14 can be performed simultaneously to enhance system performance.

As described below, the particular manner in which FTS has been implemented precludes it from taking advantage of multiple communication paths provided between any of the host processors 12 and the data storage system 14 in a multi-path computer system. It is an object of one aspect of the present invention to provide such multi-path capability to a file transfer utility (such as FTS) employing an intermediate data storage system.

SUMMARY OF THE INVENTION

One illustrative embodiment of the invention is directed to a method of transferring information between a first process running on a first computer and a second process running on a second computer, each of the first and second computers being coupled to a data storage system, the first computer being coupled to the data storage system through multiple paths. The method comprises computer-implemented steps of: (A) selecting at least one of the multiple paths through which to transfer the information between the first process and the data storage system; (B) transferring the information between the first process and the data storage system through the at least one of the multiple paths; and (C) transferring the information between the second process and the data storage system.

Another illustrative embodiment of the invention is directed to a computer system comprising a first computer to support a first process running thereon; a second computer to support a second process running thereon; and a data storage system coupled to each of the first and second computers to enable information to be transferred between the first and second processes, the first computer being coupled to the data storage system through multiple paths. The first computer includes a first controller to select at least one of the multiple paths through which to transfer the information between the first process and the data storage system, and to transfer the information through the at least one of the multiple paths. The second computer includes a second controller to transfer the information between the second process and the data storage system.

A further illustrative embodiment of the invention is directed to a method of operating a first computer in a computer system that includes the first computer, a second computer and a data storage system coupled to each of the first and second computers and including a shared storage region shared by the first and second computers, the data storage system being coupled to the first computer through multiple paths. The method comprises computer-implemented steps of: (A) requesting a connection through the shared storage region from a first process running on the first computer to a second process running on the second computer; (B) selecting, from the multiple paths, at least one path through which to transfer information between the first process and the shared storage region; and (C) using the connection, through the shared storage region and the at least one path, to communicate with the second process by transferring the information between the first process and the shared storage region.

Another illustrative embodiment of the invention is directed to a method of operating a first computer in a computer system including the first computer, a second computer and a data storage system coupled to each of the first and second computers and including a shared storage region shared by the first and second computers, the data storage system being coupled to the first computer through multiple paths. The method comprises computer-implemented steps of: (A) detecting that a connection through the shared storage region is being requested, by a second process running on the second computer, to a first process running on the first computer; (B) selecting, from the multiple paths, at least one path through which to transfer information between the first process and the shared storage region; and (C) using the connection, through the shared storage region and the at least one path, to communicate with the second process by transferring the information between the first process and the shared storage region.

Another illustrative embodiment of the invention is directed to a computer readable medium encoded with a program for execution on a computer system including a first computer, a second computer and a data storage system coupled to each of the first and second computers and including a shared storage region shared by the first and second computers, the data storage system being coupled to the first computer through multiple paths. The program, when executed on the computer system, performs a method comprising steps of: (A) requesting a connection through the shared storage region from a first process running on the first computer to a second process running on the second computer; (B) selecting, from the multiple paths, at least one path through which to transfer information between the first process and the shared storage region; and (C) using the connection, through the shared storage region and the at least one path, to communicate with the second process by transferring the information between the first process and the shared storage region.

A further illustrative embodiment of the invention is directed to a computer readable medium encoded with a program for execution on a computer system including a first computer, a second computer and a data storage system coupled to each of the first and second computers and including a shared storage region shared by the first and second computers, the data storage system being coupled to the first computer through multiple paths. The program, when executed on the computer system, performs a method comprising steps of: (A) detecting that a connection through the shared storage region is being requested, by a second process running on the second computer, to a first process running on the first computer; (B) selecting, from the multiple paths, at least one path through which to transfer information between the first process and the shared storage region; and (C) using the connection, through the shared storage region and the at least one path, to communicate with the second process by transferring the information between the first process and the shared storage region.

Another illustrative embodiment of the invention is directed to a first computer for use in a computer system including the first computer, a second computer and a data storage system coupled to each of the first and second computers and including a shared storage region shared by the first and second computers. The first computer comprises at least one processor to run a first process; a plurality of ports to couple the first computer to the data storage system through multiple paths; and at least one controller. The at least one controller requests a connection through the shared storage region from the first process to a second process running on the second computer; selects, from the multiple paths, at least one path through which to transfer information between the first process and the shared storage region; and uses the connection, through the shared storage region and the at least one path, to communicate with the second process by transferring the information between the first process and the shared storage region.

A further illustrative embodiment of the invention is directed to a first computer for use in a computer system including the first computer, a second computer and a data storage system coupled to each of the first and second computers and including a shared storage region shared by the first and second computers. The first computer comprises at least one processor to run a first process; a plurality of ports to couple the first computer to the data storage system through multiple paths; and at least one controller. The at least one controller detects that a connection through the shared storage region is being requested, by a second process running on the second computer, to a first process running on the first computer; selects, from the multiple paths, at least one path through which to transfer information between the first process and the shared storage region; and uses the connection, through the shared storage region and the at least one path, to communicate with the second process by transferring the information between the first process and the shared storage region.

Another illustrative embodiment of the invention is directed to a method of processing an out of band control command executed by a host computer in a multi-path system including the host computer, a device and multiple paths coupling the host computer to the device, the out of band control command identifying a target address in the device, the out of band control command further identifying, from among the multiple paths, a target path for transmission of the out of band control command between the host computer and the device. The method comprises steps of: (A) selecting a selected path for transmitting the out of band control command between the host computer and the device, the selected path being selected from among the multiple paths based upon a selection criteria that enables the selected path to be other than the target path identified by the out of band control command; and (B) transmitting the out of band control command between the host computer and the device over the selected path.

A further illustrative embodiment of the invention is directed to a computer readable medium encoded with a program for execution on a host computer in a multi-path system including the host computer, a device and multiple paths coupling the host computer to the device, wherein the host computer executes an out of band control command identifying a target address in the device, the out of band control command further identifying, from among the multiple paths, a target path for transmission of the out of band control command between the host computer and the device. The program, when executed on the host computer, performs a method comprising steps of: (A) selecting a selected path for transmitting the out of band control command between the host computer and the device, the selected path being selected from among the multiple paths based upon a selection criteria that enables the selected path to be other than the target path identified by the out of band control command; and (B) transmitting the out of band control command between the host computer and the device over the selected path.

Another illustrative embodiment of the invention is directed to a host computer for use in a multi-path system including the host computer, a device and multiple paths coupling the host computer to the device. The host computer comprises at least one processor to execute an out of band control command identifying a target address in the device, the out of band control command further identifying, from among the multiple paths, a target path for transmission of the out of band control command between the host computer and the device; and at least one controller. The at least one controller selects a selected path for transmitting the out of band control command between the host computer and the device, the selected path being selected from among the multiple paths based upon a selection criteria that enables the selected path to be other than the target path identified by the out of band control command; and transmits the out of band control command between the host computer and the device over the selected path.

BRIEF DESCRIPTION OF THE DRAWINGS

FIG. 4 shows the structure of Master Control Block data structure used to implement FTS;

FIG. 5 shows the structure of the Process Id Table used to implement FTS;

FIG. 6 shows the structure of the Secondary Device Table used to implement FTS;

FIG. 7 shows the structure of the Process Segment Pointer Table used to implement FTS;

DETAILED DESCRIPTION

Illustrative Implementation of FTS

Figure 1:
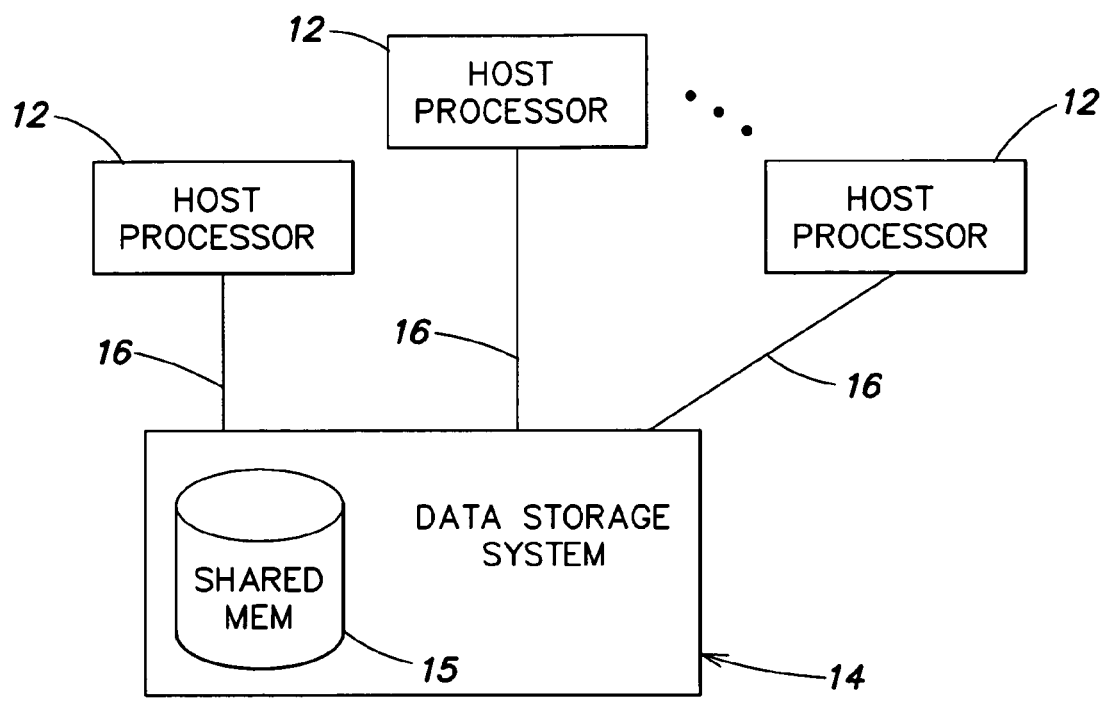
FIG. 1 is a block diagram of a typical system in which the FTS file transfer utility is implemented.

Referring to FIG. 1, a system on which FTS can be implemented includes a plurality of host processors 12 that are connected to a central data storage system 14. Host processors 12 can be digital processing units which include one or more CPU's and main memory. They might be, for example, PC's, workstations, symmetric multiprocessors (SMPs) or a massively parallel processor (MPP) which has many CPU's.

In general, data storage system 14 contains a shared memory 15 that is accessible to at least two of the host processors connected to the system. The control structures and transfer buffers that are stored in the shared memory provide a mechanism by which one host processor can transfer files to and/or receive files from another host processor that is connected to the data storage system.

Figure 2:
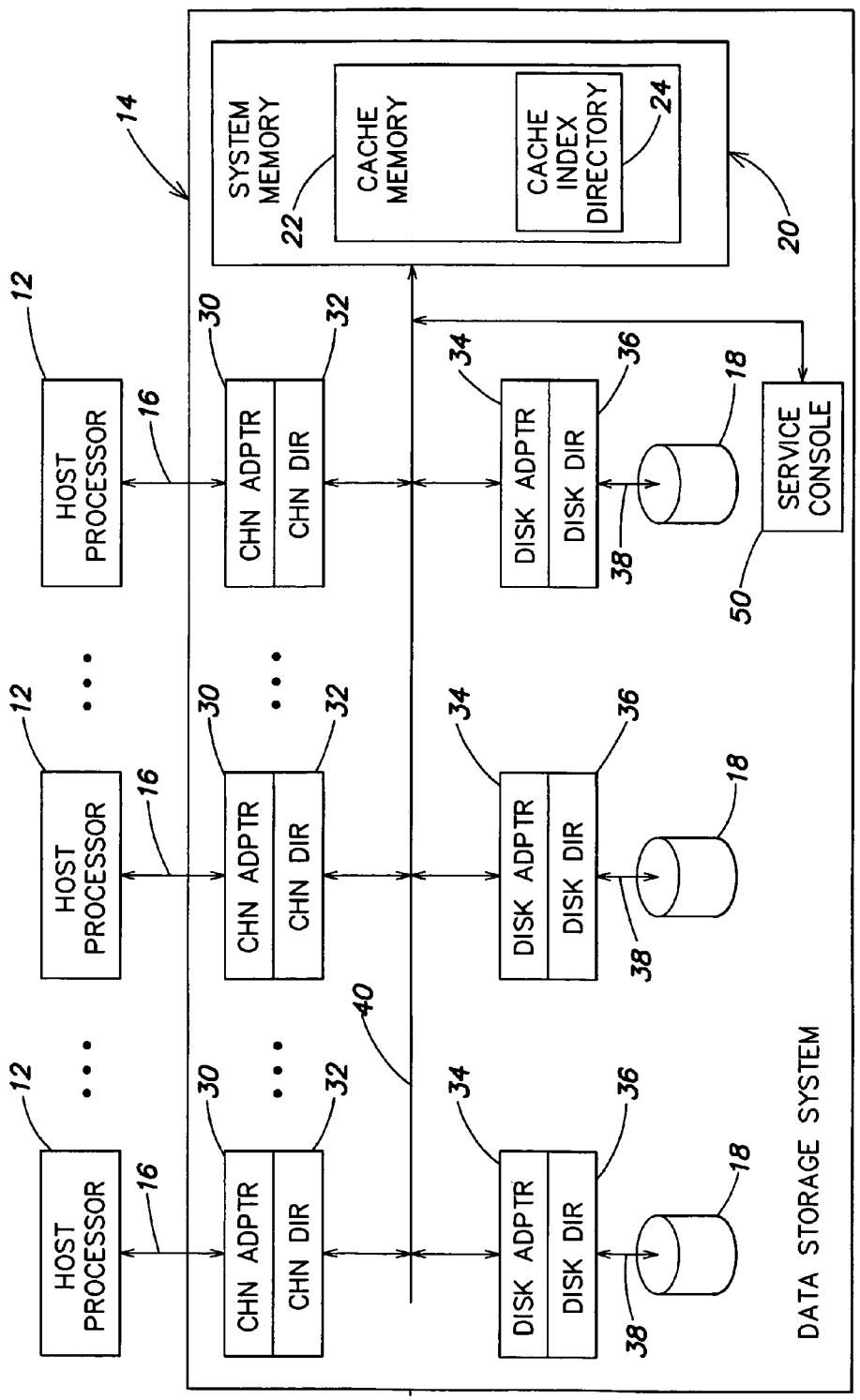
FIG. 2 is a block diagram showing the internal structure of a data storage system such as might be used in the system of FIG. 1.

Referring to FIG. 2, each of host processors 12 is connected to data storage system 14 through respective host connections 16. To simplify the discussion, only a single host connection 16 is shown for each host processor. However, as discussed above, there can in fact be multiple connections between the data storage system and a processor 12.

Data storage system 14 contains the physical memory in which data is stored. The particular manner in which the physical memory within storage system is implemented and how it is partitioned is not of central importance. Examples of commercially available products that can be used to implement data storage system 14 are the Symmetrix 5XXX™ series family of products, from EMC Corporation of Hopkinton, Mass., which are high-performance integrated cache disk arrays designed for online data storage. The following details about the internal structure and operation of data storage system 14 generally apply to the Symmetrix™ data storage systems. However, it should be understood that FTS is not limited to use with a storage system 14 having such an architecture, as other designs may also be used to implement data storage system 14.

Data storage system 14 includes multiple arrays of disk devices 18 and a system memory 20. A portion of system memory implements cache memory 22. The multiple arrays of disk devices 18 provide a non-volatile data storage area and cache memory 22 provides a volatile data storage area. Each disk device 18 includes a head-disk assembly, a microprocessor, and a data buffer which enables the data storage system to provide for parallel processing of data. In the described embodiment, system memory 20 is implemented by high-speed random-access semiconductor memory. Within cache memory 22 there is a cache index directory 24 which provides an indication of what data is stored in cache memory 22 and the address of that data in cache memory 22. Cache index directory 24 can be organized as a hierarchy of tables for devices, cylinders, and tracks of data records, as further described in U.S. Pat. No. 5,206,939, issued Apr. 27, 1993.

In general, there is a group of channel adapters 30 and channel directors 32 that provide interfaces through which host processors 12 connect to data storage system 14. Each channel adapter 30 provides for direct attachment to the physical host connections. Channel director 32 contains a microprocessor that processes commands and data from host processors 12 and manages accesses to cache memory 22. Channel director 32 handles I/O requests from host processors 12. It uses cache index directory 24 which is stored in cache memory 22 to determine whether the request can be satisfied out of the cache or whether the data must be obtained from disk devices 18. It maintains data in cache memory based on the data access patterns. Channel directors 32 write data from host processors 12 into cache memory 22 and update cache index directory 24. They also access cache index directory 24 and read data from cache memory 22 for transfer to host processors 12.

There is also a disk adapter 34 and a disk director 36 through which each disk device array 18 is connected to cache memory 22. Disk adapter 34 interfaces to multiple SCSI buses 38 to which disk device arrays 18 are connected. Disk director 36 manages accesses to the disks within disk device arrays 18. Disk Director 36 stages data from the disk device arrays to cache memory 22 and it updates cache index directory 24, accordingly. It also de-stages or writes-back data from rom "written-to" blocks in cache memory 22 to the disk device arrays and again updates cache index directory 24, accordingly.

Disk adapters 34 and channel adapters 30 access system memory 20 through a high-speed parallel line system bus 40. System memory 20 is implemented by multiple memory boards. Only one access to any given memory board may occur at any given time, however, multiple memory boards may be accessed at the same time to support concurrent operations.

Data storage system 14 can be configured into multiple logical volumes. Typically, a volume corresponds to a single disk device. A service console 50 within data storage system 14 enables the user to configure the data storage, i.e., to define the logical volumes and to specify which logical volumes are accessible through which host connections 16. In the described embodiment, at least one volume is used to implement the file transfer mechanism that is described in greater detail below. That logical volume is configured as a shared volume that is accessible through two or more host connections 16. Host processors 12 use the shared volume as a transfer buffer through which files are transferred to other host processors connected to the data storage system.

Note that data storage system 14 also includes additional functionality and features which are typically found in such system. For example, data storage system 14 also includes a lock manager which coordinates write accesses to logical volumes. Because such functionality and features are known to persons skilled in the art they will not be described here.

Basic Mechanisms

In the case of the Symmetrix, a large number of hosts (e.g., 16–32) can connect to the unit. It also enables one to mix mainframes and standard SCSI (i.e., open systems). Within the Symmetrix, the software controls the allocation of disks to the various ports to which host system are connected. It is possible in the software to map the same disk drive(s) to multiple ports. In fact, one can map it to an arbitrary number of ports up to the full capacity of the system (e.g., 16–32). The file transfer system described in the FTS application takes advantage of these capabilities to implement a set of shared on-disk control and buffer structures and a protocol for transferring files between systems.

The FTS includes a software utility that transfers files between one host processor and another host processor. Since both open systems and mainframe systems can be connected to the Symmetrix, the FTS enables users to transfer files at high speed between MVS-based systems and UNIX® based systems. The FTS, which uses the ICDA and the high speed cache for file transfers, requires at least one shared disk for control structures and transfer buffers. For added "bandwidth," additional disks can be allocated for data transfer buffers, spreading the I/O load across multiple devices and potentially across multiple ports. The disk holding the control structures is called the master disk. Any additional disks are called secondary transfer disks.

The control structures on the master disk, which are in addition to the transfer buffers, consist of a Master Control Block (FIG. 4), a Process Id Table (FIG. 5), a Secondary Device Table (FIG. 6), and a Process Segment Pointer Table (FIG. 7). The FTS protocol is designed so that the only structure requiring access control is the Process ID table, which is used to allocate resources for multiple transfer operations. Contention is thus limited to the allocate and deallocate operations. Since the allocate and deallocate operations are relatively infrequent, compared to the operations for file transfer, contention for the master device is thus kept to a minimum by this approach.

A file transfer is implemented by using two processes, one process is running on the system that initiates the file transfer request, called the initiator, and the other process is running on the system that responds to the file transfer request, called the connector. The processes coordinate the transfer by writing and reading to the control structures and transfer buffers. SCSI reserve and release operations are used when writing to the Process Id Table to prevent dirty reads. Both processes poll the master device if data is not available.

Architecture

Figure 3:
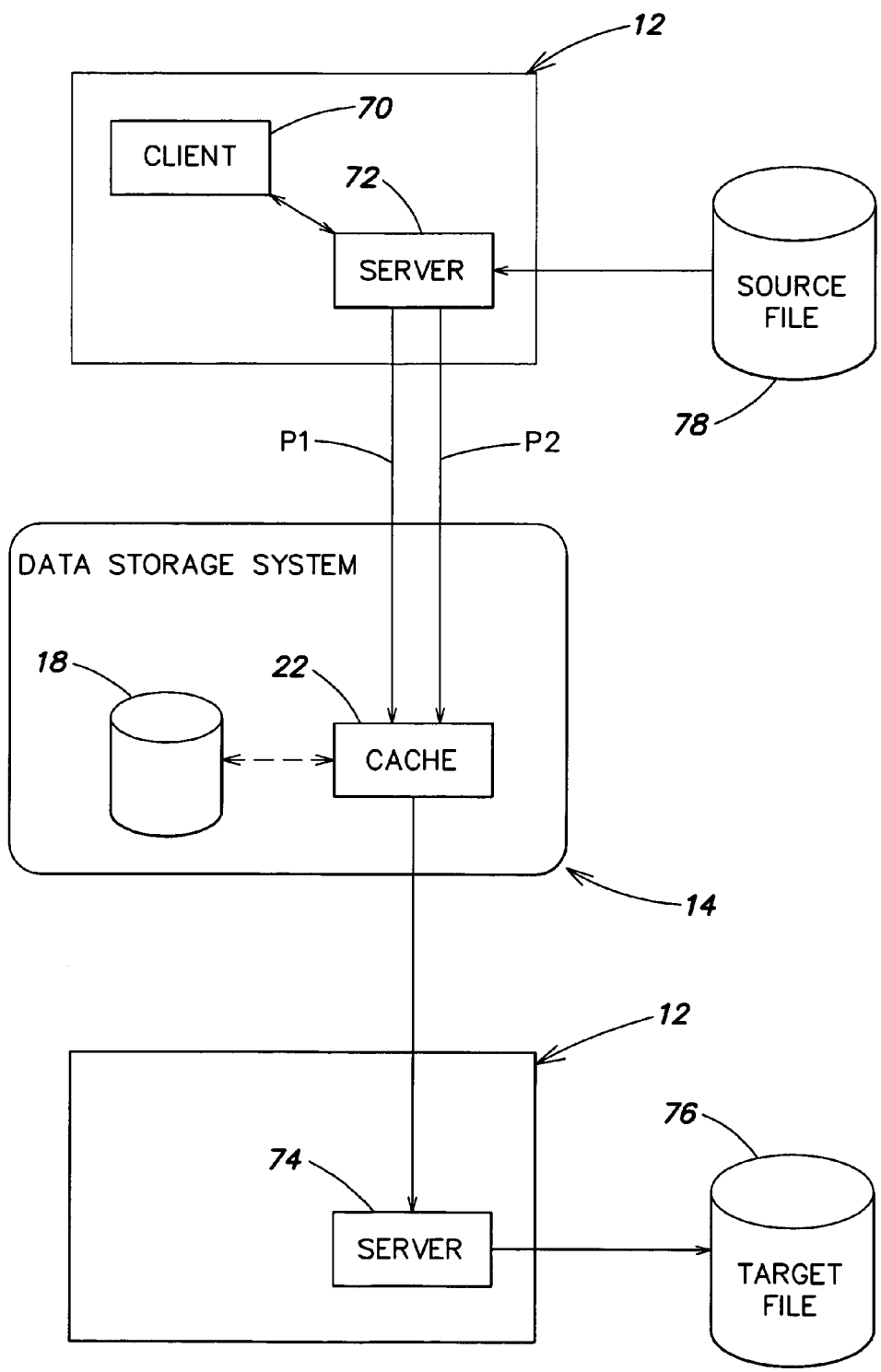
FIG. 3 shows the general architecture of the FTS.

Referring to FIG. 3, the overall FTS system architecture is a variation of the client-server architecture. The present architecture could more accurately be called client server—server because the FTS software which is installed on both host processors must implement at least one client 70 and two servers 72 and 74 in the file transfer environment. The client 70 makes a file transfer request, e.g., the client requests the transfer to a target file 76 of the contents of a source file 78 that is under the control of the other server 74. The server processes the request. The source and target files 78 and 76 are typically located in other storage devices, e.g. disks, that are local to the respective host processors. The file transfer occurs through the data storage system which acts as a staging buffer and transport medium for the data. In the described embodiment, all the data is placed in the high speed cache of the data storage system and thus the data transfer occurs at maximum speed.

A user interface, that allows input of various operator commands, is a command line on the host terminal. The commands, a relevant subset of which are discussed below under the heading "FTS Commands", manage file transfers and send messages between the local and remote system nodes. The FTS client on that host processor interprets the FTS commands and then sends a transaction to the FTS server on the same host processor. The FTS server manages the request to transfer the data.

File Transfer Utility On Disk Structures

The FTS uses a set of data structures on one of the transfer disks, called the master device, to handle requests for file transfer and to coordinate the use of transfer buffers between the initiating and connecting server processes during a file transfer. These structures start at block 5 on the master device, with block 4 zeroed as a precaution. As indicated, the structures include:

Master Control Block
Process (connection) Id Table
Secondary Device Table
Process Segment Pointer Table(s)

The data storage system itself does not understand these control structures. They are a construct of the file transfer software itself. The data storage system simply presents a blank disk on which to store them. Each of the data structures will now be described in detail.

Master Control Block

The Master Control Block keeps basic information regarding where the other data structures and transfer buffers are laid out on the disks. Among other things, it contains pointers to all the other disk structures used by the FTS. By default, this structure is written to block 5 on the master device.

The fields of the Master Control Block are shown in FIG. 4. The following is a description of fields and their functions.

A blk5__id field is provided for identifying whether the device on which the block is, stored is a master device or a secondary device. A secondary device is kept on another disk, though it is not used in the described embodiment.

A blk5__dev__id field is provided for identifying the entry number of the master device in the secondary device table.

A blk5__seg__size field is provided for specifying the size of the transfer segment in blocks. In other words, this specifies the size of the transfer buffer, i.e., the buffer that is available for the actual file transfer operations.

A blk5_version field is provided for specifying the version number of the Master Control Block structure.

A blk5_time_id field is provided for specifying the creation time of the master control block.

A blk5_tot_seg_num field is provided for specifying the total number of transfer segments that are available on the disks. This is a function of the number of disks that were provided (i.e., the number of buffers).

A blk5_process_id_table_ptr field is provided for storing a pointer to the start of the Process Id Table structure.

A blk5_secondary_device_table_ptr field is provided for storing a pointer to the start of the Secondary Device Table structure.

A blk5_secondary device entrynum field is provided for specifying the number of entries in the Secondary Device Table (i.e., the number of disks that are used). Note that the secondary devices are disks.

A blk5_start_process_segment_ptr field is provided for storing a pointer to the start of the Process Segment Pointer Table structures.

A blk5_max_connections field is provided for specifying the maximum number of concurrent connections that are allowed for a file transfer.

A blk5_mast_sec_start_segment_ptr field is for storing a pointer to the start of the data segments.

A blk5_ptr_seg_per_process field is provided for identifying the number of segments per process (i.e., per file transfer connection).

A blk5_maxptr field is provided for specifying the maximum number of segments per process. In the described embodiment, the values stored in the blk5_maxptr field and the blk5_ptr_seq_per_process field are the same, though they need not be.

A blk5 unix_filename field is provided for storing the UNIX file name of the master device.

Process (Connection) ID Table

The Process ID Table is actually used to solicit and acknowledge connections between the initiator server and the connection server. This is the only table on which locking is performed. It is locked for a short period of time at the start of a file transfer connection while the initiator process writes its data into an open entry within the table.

The fields of the Master Control Block are shown in FIG. 5. The following is a description of those fields and the uses to which they are put.

A pro_process_id field is provided for identifying the connection or slot number to which the host is connected.

A pro_flag_process field contains a set of flags including a PRO_FLAG_ALLOCATED flag, a PRO_FLAG_PROCESSING flag, and a PRO_FLAG_MVS flag. The PRO_FLAG_ALLOCATED flag is used to indicate whether the entry is allocated, the PRO_FLAG_PROCESSING flag which is used by a connector process to acknowledge a connection request and to thereby establish a connection, and the PRO-FLAG_MVS flag is used to indicate whether the requestor process is running MVS.

A pro_con_rc field is provided for storing status codes which are used to pass various status information between the two processes.

A pro_requestor field is provided for indicating the name of the requestor (i.e., initiator) process. When the host processes are started, they are given an arbitrary name (e.g., up to 8 characters). It is this name which is used here.

A pro_requestor_password field is provided for storing an optional password for the requestor process.

A pro_requestor_type field is provided for indicating the OS type of the requestor process. The values for OS types are: PRO_TYPE_UNIX which indicates that it is UNIX type; PRO_TYPE_TEXT, which indicates that it is text type; PRO-TYPE_NT which indicates that it is a Windows NT type; PRO_TYPE_TPF, which indicates that it is IBM's Transaction Processing Facility; and PRO_TYPE_UNKOWN, which indicates that its type is unknown.

A pro_requestee field is provided for indicating the name of the requestee (i.e., connector) process.

A pro_requestee_type field is provided for indicating the OS type of requestee process.

A pro_dtd field is provided for holding a command structure for initiator to connector communications.

A InitM field is provided for storing a command structure for connector to initiator communications.

In host processors which use a UNIX operating system the TCP/IP protocol is used for client to initiator communications. However, since not all operating systems support this protocol, another mechanism, which utilizes the pro_dtd and InitM fields, is provided which is a variant of the initiator/connector protocol. This alternative mechanism allows, for example, a client on an MVS system to write its command requests to the initiator by writing them to an appropriate one of these fields. There is a secondary polling taking place according to which the initiator looks in the Process Id Table for communications from the client. The pro_dtd field is used for initiator to connector communications and the pro_InitM field is used for connector to initiator communications.

Secondary Device Table

The secondary device table contains information about where the data segments are located on each transfer device and is used by the processes to keep track of those data segments. All data segments are numbered from 1 to however many there are.

The fields of the Secondary Device Table are shown in FIG. 6 and the following is a description of those fields and the uses to which they are put.

A sec_dev_id field is provided for storing the identity of the device on which the segments are located. This information comes from a configuration file that is generated when the ICDA is set up.

A sec_str_seg_ptr field is provided for storing a pointer to the start of the data segments on the device that is identified in the sec_dev_id field.

A sec-seg_number_for_device field is provided for specifying the number of data segments that are included on the device.

A sec_start_segment_number field is provided for specifying the segment number of the first segment on the device.

Process Segment Pointer Table

There are two process segment pointer tables for each process. Logically, the two Process Segment Pointer Tables are circularly linked lists. One Process Segment Pointer Table points to the segments that are used for initiator to connector communications and the other Process Segment Pointer Table points to the segments that are used for connector to initiator communications. These two tables are the primary players in the transfer protocol. That is, once the transfer begins, it is this table that provides the primary control and synchronization of the file transfer.

In order to avoid having to lock the transfer devices, the initiator, as a rule, writes only to an initiator_to_connector Process Segment Pointer Table and the segments pointed to by it. The connector writes only to a connector_to_initiator Process Segment Pointer Table and the segments pointed to by it. Both processes step through the tables in order, looping back to reuse the first entry when the end of the table is reached. In effect, this creates a pair of circular buffers for communications. In the described embodiment, the number of entries in each Process Segment Pointer Table is 640.

The fields of the Process Segment Pointer Table are shown in FIG. 7 and the following is a description of those fields and the uses to which they are put.

A ptr_process_segment_ptr field is provided for storing a number identifying the logical address of the data segment (i.e., transfer buffer) containing the data. The Secondary Device Table is used to translate this number to an actual physical location at which the data is stored in the ICDA. The physical location will include the identity of the device and the offset from the first segment on that device.

A ptr_process_segment_f lg field includes a set of flags which are used to indicate the current status of the segment. One of the flags is used to indicate whether there is valid data in the segment, another flag is used to indicate whether the data in the segment has been read, and a third flag is used to indicate that it is the last data segment. The field also includes other bit flags that are used to pass status information between the connected servers.

A ptr_process_block_seq field is provided for storing a sequence number that is inserted by the process that is responsible for writing to this particular table. This sequence numbers which represent a running count are generated in sequential order by a counter until sufficient segments have been provided to write all of the file data into the transfer buffer.

A ptr_process_req_id field is provided for storing another smaller sequence number that is also inserted by the process. These numbers are also generated in sequential order by another counter, modulo 16. In other words, it is a shorter running count. As will become clearer in the following description, the sequence numbers in this field and the previous field are used to make sure that the initiator and connector processes both remain in lock step while file data is being transferred from the writing process to the reading process.

A ptr_process_blk_read field is provided for specifying the size of a segment in blocks. This number is determined at the time of initialization.

File Transfer Protocol

A format program which is run before the file transfer protocol allocates space on the transfer disks and creates and writes out the control structures.

Creating a Transfer Process (Connection)

To set up for a file transfer (or a series of transfers), the initiator process running on one system first uses the Process Id Table to request a connection to an identified connector process. And the connector process, typically running on another system, uses the Process Id Table to acknowledge a connection between the initiator process and the connector process.

Figure 8:
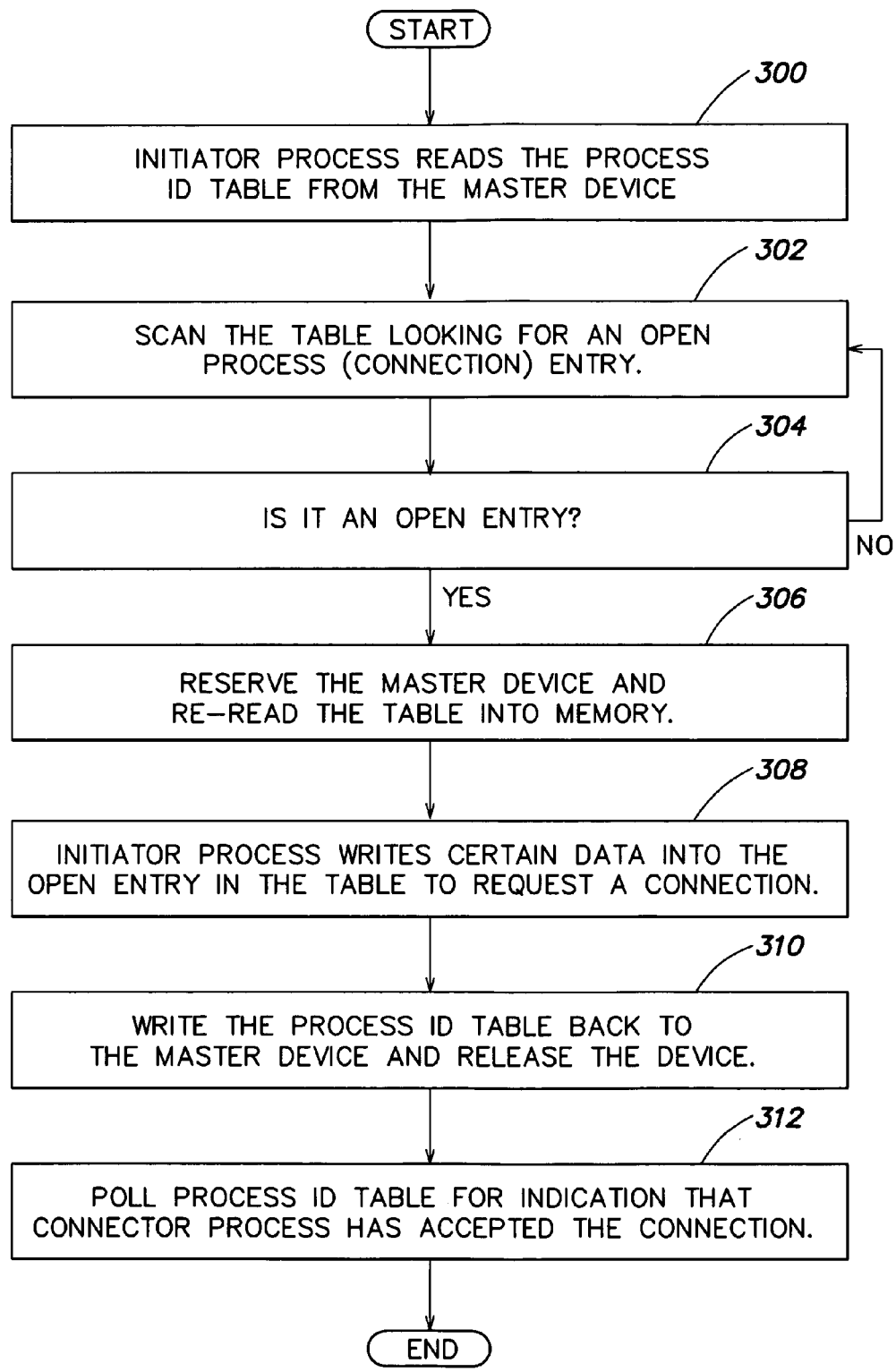
FIG. 8 is a flow chart of the operations that are performed by an initiator process in creating an FTS transfer process (i.e., a connection)

The procedure for establishing the connection is shown in FIG. 8.

First, the initiator process reads the Process ID Table from the master device (step 300) and scans the table looking for an open process (connection) entry (step 302). It does this by checking whether the PRO_FLAG_ALLOCATED flag in the pro_flag_process field is cleared (step 304). If it is, it is an open entry. If the entry is not open, the initiator process continues scanning for an open entry.

When it finds an open entry, it then reserves the master device and re-reads the table into its memory (step 306). This assures that it is using the most up-to-date version and that no other process can inadvertently interfere with the request that is to be made. With the reread version that is now in the system's local memory, the initiator process then writes certain data into the open entry in the table that is necessary to request a connection (step 308). That is, it writes into the pro_requestee field the name of the transfer server process to which it desires a connection, it writes its own name into the pro_requestor field, and it writes its OS type into the pro_requestor_type field in the open slot in the Process Id Table. The initiator also sets the PRO_FLAG_ALLOCATED bit in the pro_flag_process field to notify other processes that this entry of the table is now being used. After it has written this information into its copy of the Process Id Table, it then writes the Process Id Table back to the master device and releases the device (step 310).

The Process Id of the requested connection becomes the Process Id Table entry number (1-based) that is found in the pro_process_id field.

After the Process Id Table has been written back to the master device, the initiator process periodically polls the Process Id Table waiting for an indication that the identified connector process has accepted the connection request, thereby establishing a connection (step 312).

Figure 9:
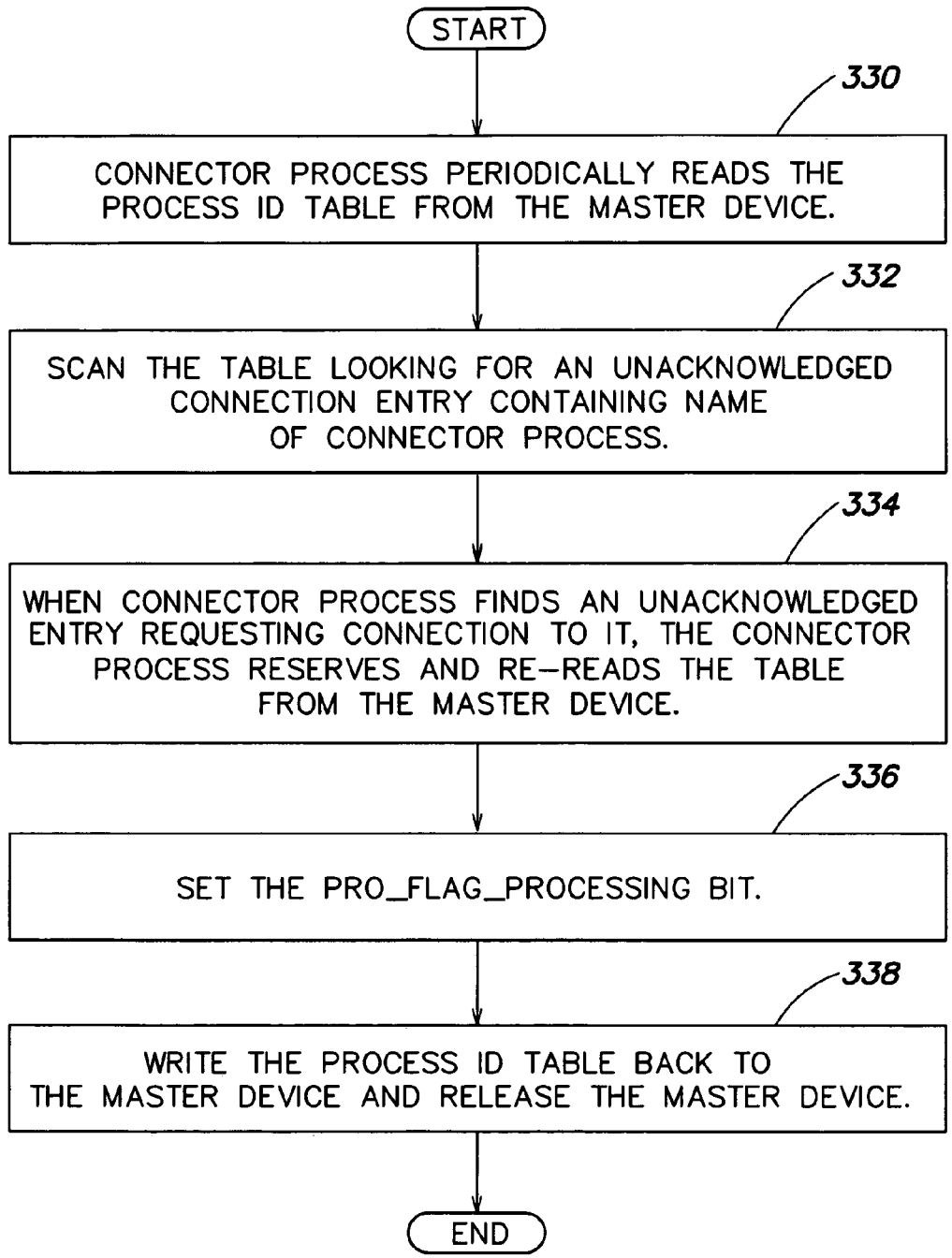
FIG. 9 is a flow chart of the operations that are performed by the connector process in establishing a connection.

Referring to FIG. 9, each of the other processes that has been established periodically reads the Process Id Table from the master device (step 330) and scans the table looking for an unacknowledged connection entry containing its name (step 332). In the described embodiment, the polling frequency is about every second though other polling frequencies can also be used. When it finds such an entry, it reserves the master device and re-reads the table from the master device (step 334). The connector process then accepts the request for a connection by setting the PRO_FLAG_PROCESSING bit in the pro_flag_process field of the appropriate table entry (step 336) and then it writes the Process ID Table back to the master device and release the master device (step 338).

When the connector writes an acknowledgment, the initiator will see it and then confirm to the client that an open link has been established.

It should be noted that the resources needed to handle transfers are effectively reserved as soon as the initiator writes the Process Id Table back to the master disk. Thus, the FTS can actually proceed with writing data or commands to the data segments before the connector process has accepted the connection.

Transferring File or Command Data

The actual transfer process, by using paired Process Segment Pointer Tables and associated buffers to avoid two processes having to write to the same structure, is designed to be contention free. The initiator process writes to its copy of the Process Segment Pointer Table and transfer buffers and reads from the connector's copy of the Process Segment Pointer Table and transfer buffers. Similarly, the connector process writes to its copy of the Process Segment Pointer Table and transfer buffers and reads from the initiator's copy of the Process Segment Pointer Table and transfer buffers. The two processes move sequentially through their segment pointer tables in a form of modified lock-step. If the end of the Process Segment Pointer Table is reached, the process wraps around to the beginning of the table. At startup and at the end of processing each command, the initiator and connector processes clear their respective Process Segment Pointer Tables and set their respective index counters to zero, so that on the next command both processes start from the beginning of their respective tables.

In the following description, we refer to "reading" and "writing" processes rather than to initiator and connector processes. This is because they can swap roles depending on which direction data is flowing. For example, the client can do a PUT or a GET command. The PUT command is used to send a file to the other host and the GET command is used to retrieve a file from the other host. Thus, data will flow in one direction or the other and the use of the Process Segment Pointer Tables flips depending upon which command is used. That is the reason a distinction is made between initiator/connector as well as between reader/writer. An initiator can be either a reader or a writer.

Writing Process

Figure 10A:
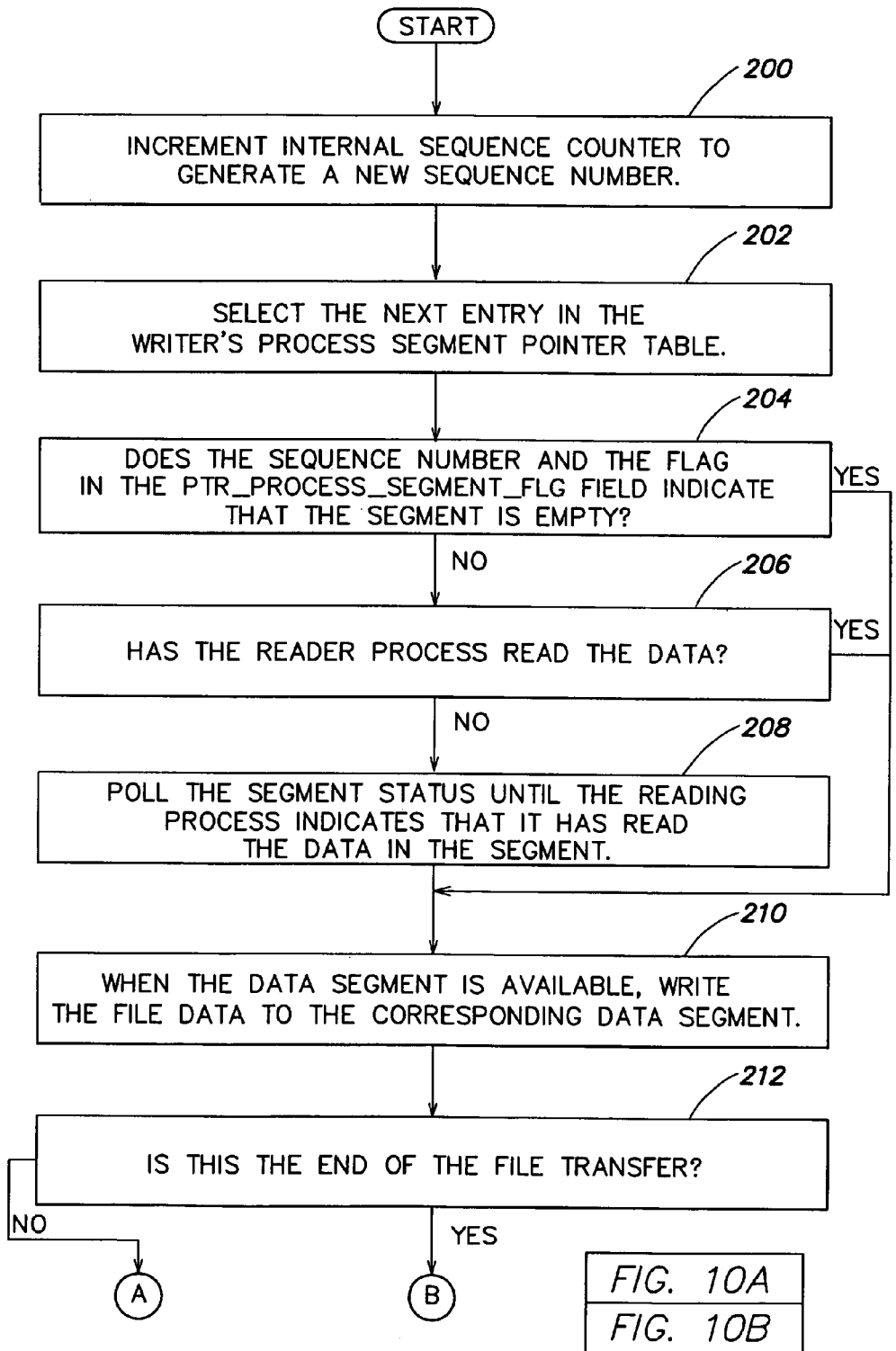
FIG. 10 is a flow chart of steps of performing an FTS writing process.
Figure 10B:
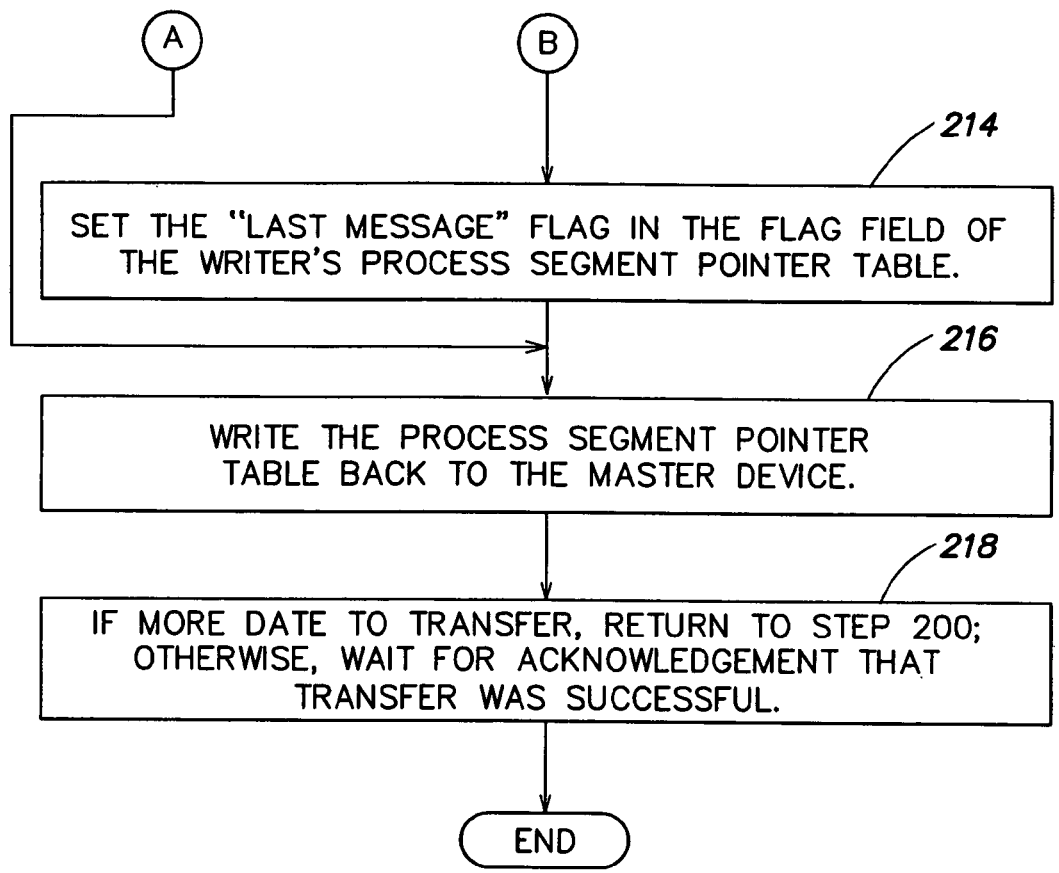

Referring to FIG. 10, the writing process increments its counter to generate a new sequence number (step 200), it selects the next entry in its Process Segment Pointer Table (step 202), and it determines if that next entry is available (step 204). The writing process makes this determination by checking the appropriate flag in the ptr_process_segment_flg field. If the sequence number is zero and the flag field indicates that the corresponding segment has not yet been used during this connection (i.e., is empty), then it is available for a data or command transfer and the writing process writes data to the available segment (step 210).

On the other hand, it is possible that the writing process has already written to all of the transfer buffers and thus the data segments will not be empty, e.g., the sequence number is nonzero and/or the flag indicates that there is valid data in the segment. In that case, the writing process reads the corresponding entry in the reader's Process Segment Pointer Table, i.e., the entry found by the sequence number, to see whether the reader process has read the data yet (step 206). If the reader has read the data, this will be indicated by the relevant flag in the ptr_process_segment_flg field. Note that the flag field in the reader's Process Segment Pointer Table is set to 0x40 if the writer is the initiator process, and it is set to 0x80 if the writer is the connector process.

If the segment is "busy", i.e., contains valid data that has not yet been read, the writing process polls the segment status until the reading process indicates that it has read the data in the segment (step 208). If the segment is available, the writing process references the Segment Device Table to determine the physical location of the data segment that is identified by the first field (i.e., the ptr_process_segment_ptr field) in the current entry of the Process Segment Pointer Table and then writes its data to that data segment, along with some header information that is used for error checking; i.e., checking that the writing and reading process remain in lock step (step 210). It also sets the flag and writes the sequence numbers into the sequence number fields to indicate that new data has been written to the data segment.

The information that is copied into the header of the transfer buffer includes the segment sequence number and the process request sequence number, both of which were generated by the writing process for this particular segment. It may also include a time stamp and other information which may be used by the reading process that the data segment which is read contains the information that was expected. That is it is used as a cross check on the transfer.

If the writing process has completed the file transfer, it will also indicate the end of a file transfer by setting a "last messages" flag (0x20) in the flag field of its Process Segment Pointer Table. After doing that, the writing process will periodically poll its own Process Segment Pointer Table waiting for the reading process to signal its completion of reading the data. The reading process signals its completion by cleaning up (i.e., clearing) both Process Segment Pointer Tables, thereby causing the flag field in the first entry to be zeroed. Once the flag field is zeroed, if the writing process is the connector, it then starts polling the Process Id Table, waiting for another command from the initiator process.

After the writing process writes its data to the transfer buffer, it lets the reading process know that new data is ready by writing its Process Segment Pointer Table back to the master device (step 216). If there is more data to be transferred, the writing process will return to step 200 where it increments its internal sequence counter and repeats the above-identified process; otherwise, it will simply wait for the reading process to signal its completion of the file transfer (step 218).

Note that the writing process can be configured to write several data segments before actually writing its Segment Pointer Table back to disk. This option, which is referred to as a multi-buffer read/write scheme, is implemented by setting the parameter specified in the blk5_ptr_seg_per_process field in the Master Control Block to a number greater than one. The multi-buffer read/write scheme can be used to reduce I/O overhead to the master device.

The writing process can be programmed to write a number of transfer segments before updating its Process Segment Pointer Table. The parameter which sets the number of segments that can be written at one time is set by an external parameter. If that parameter is set to n#0, the connector will write n buffers or until it reaches the end of the file. The reading process also knows that it can read n buffers before it needs to update its Process Segment Pointer Table.

There is an inherent blocking mechanism built in to the transfer protocol. Eventually, for large enough files, the writing process will wrap around to the end of the chain of buffers. At that point if the reading process has not yet read any of the transfer buffers, the writing process will block, i.e., it will not be able to write any more data to the transfer buffers until the reading process signals that it has read the buffers which are now needed by the writing process. If the writing process were to write more before receiving that signal, it would overwrite data in buffers that have not yet been read. During a block, the writing process polls until it sees that new buffers have been freed up.

It should also be noted that one of the processes, e.g., the writing process prior to beginning the file transfer, can optionally turn off the destaging feature of the data storage system. Thus, during the file transfer, none of the data written to cache will be destaged to a disk and thus cause the transfer to slow down. That is, by turning off the destaging feature, the entire transfer can be caused to take place using only the much faster cache memory.

Reading Process

Figure 11:
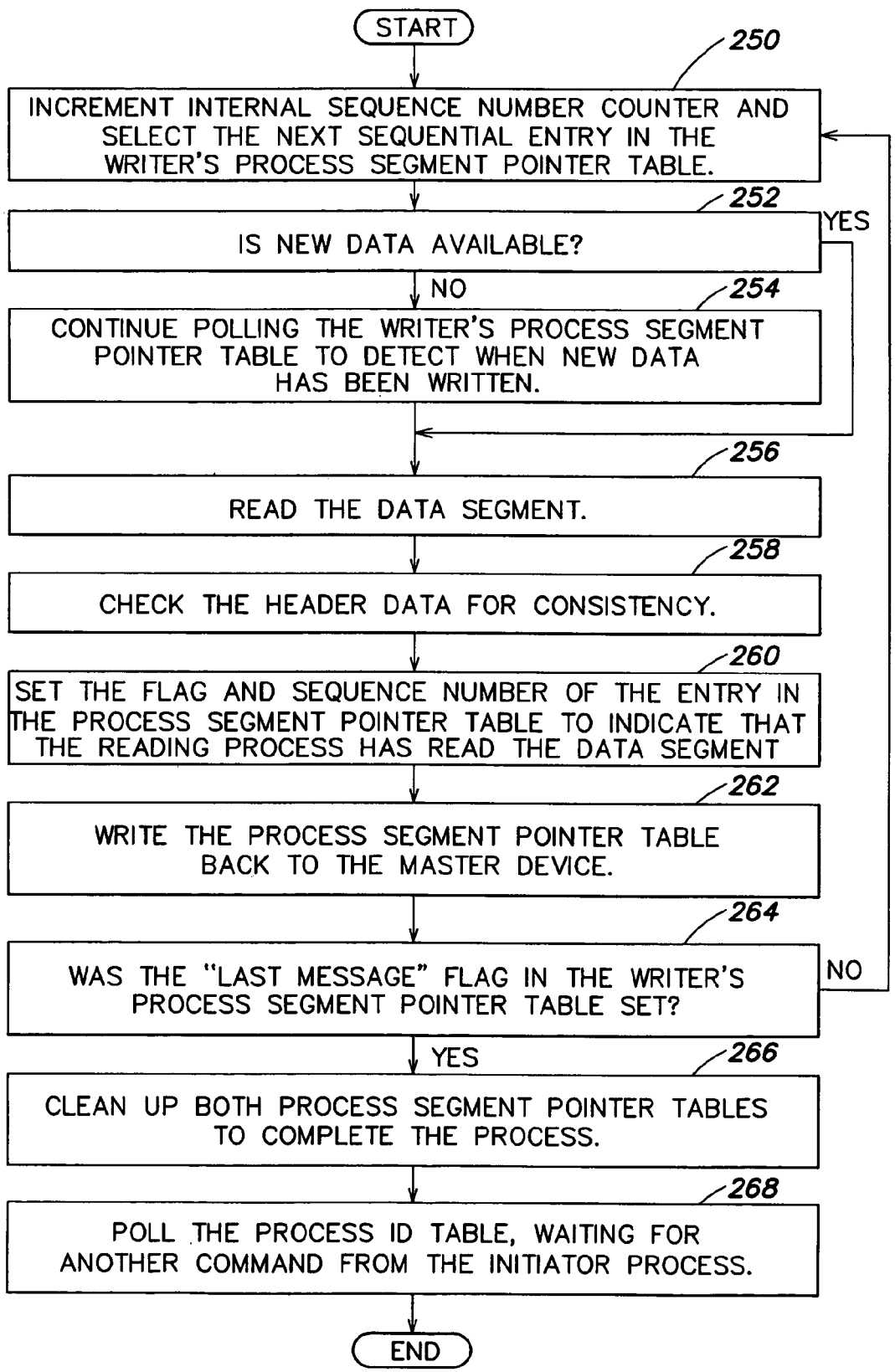
FIG. 11 is a flow chart of steps of performing an FTS reading process.

Referring to FIG. 11, the reading process increments its internal counter to generate the next sequence number, selects the next sequential entry in the writing process' Process Segment Pointer Table (step 250) and checks whether new data is available (step 252). This will be indicated by the flag field in the writer's Process Segment Pointer Table being set to 0x40, if the reading process is the initiator, or being set to 0x80, if the reading process is the connector, and by the sequence number from the internal counter equaling the sequence number in the writer's Process Segment Pointer Table entry.

If no data is available, the reading process continues to poll the writer's Process Segment Pointer Table, waiting for new data to be written (step. 254).

If data is available, the reading process reads the data segment (step 256) and checks the header data for consistency (step 258). If the header information is consistent, the reading process sets the flag and the sequence number of the corresponding entry in it's Process Segment Pointer Table to indicate that it has read the data segment (step 260).

To check the header for consistency, the reading process compares the stored segment sequence number and process request sequence number with the values generated by the counters in the reading process. The numbers should be the same if the data segment is the correct data segment. If the numbers do not match, that is an indication that a desequencing error has occurred, i.e., the writing process and reading process have gotten out of synchronization and that the data segments are not being read in the order that was intended. Under those circumstances, the file transfer is rolled back so as to restart from a point at which the sequencing was correct and retransmit the data from that point.

To let the writing process know that the data has been read, the reading process then writes its Process Segment Pointer Table back to the master device (step 262). As with the writing process, the reading process can also read several segments before writing its Process Segment Pointer Table back to disk, thereby reducing overhead I/O.

If the "last message" flag in the writer's Process Segment Pointer Table is set (step 264), the reading process cleans up both Process Segment Pointer Tables to complete the connection process (step 266). The clean up of the Process Segment Pointer Tables involves clearing or zeroing the contents of the ptr_process_segment_flag, the ptr_process_block_seq, and the ptr_process_req_id fields. If the reading process is the connector, it then starts polling the Process Id Table, waiting for another command from the initiator process (step 268).

As should be apparent from the above description, both the writing process and the reading process walk through the Process Segment Pointer Table in sequential order. However, the actual data segments may be laid out in any order on the devices. There are several possible schemes for distributing the transfer buffers across the disks. In the described embodiment, the distribution is randomized. Alternatively, a standard sequential stripping could be used or they could be distributed in chunks so that all buffers for a given connection are on one disk. The invention is not meant to be limited by the approach that is used in distributing the transfer buffers across the devices.

Effectively, an FTS server process can be in one of two modes, either command transfer mode or file transfer mode. In the command transfer mode, the initiator process is waiting for the user to issue a request, while the connector process is polling and waiting for a command to be passed in the first data segment via the transfer disk. In the file transfer mode, one server will be sending a series of data segments via the transfer devices, while the other server loops, reading the data segments until one segment arrives with a "last message" flag, indicating the end of the transfer. At that point, both processes drop back to command mode.

The transfer protocol is itself indifferent as to whether it is a command or data that is being sent. The process at either end knows that a command has been sent based upon situational information. In other words, if no file transfer is occurring or has been requested, then the connector when first notified of a transfer will assume that a command is being transferred. If a process sends a command, then it will assume that the information that is coming back from the target is a response to the command. Once a connection is established, both processes will treat the information that is being transferred as part of the file transfer process at least until an end of file indication is sent. If connection has not received anything for awhile, it will assume that the next thing that it receives will be a command.

It should also be appreciated that the use of the two Process Segment Pointer Tables actually permits duplex communication, if that is desired. Also, with the FTS one can implement multiple concurrent point-to-point file transfers. This includes the possibility of multiple processes running an a single host opening connections to multiple processes.

The principles of the underlying protocol can be used for any kind of transfer, not just file transfers as described herein. For example, one could build a network socket interface on top of the protocol for sending data over the Internet. Or it could also be used to implement a variation of the UNIX SEND/RECEIVE commands for bulk transfer of data from one process to another.

FTS Commands

The commands listed below are used to work with and transfer data. The commands are entered either from an MVS terminal or a UNIX workstation, depending on the operating system open server_name: The open command creates a connection to a remote host server (i.e., server_name).

get source_file target_file: The get command is used to copy a file from the remote host to the local host. Source_file is the full path name of the file on the remote host and target_file is the fully associated path name of the location name on the local host to which the file will be copied.

put source_file target_file: The put command is used to copy a file from the local host to the remote host. Source_file is the full path name of the file on the local host and target_file is the fully associated path name of the location/name on the remote host to which the source file will be copied.

replace get(put) source_file target_file: The replace command is used to replace (overwrite) the existing output file on the receiving host when followed by entry of the get or put command.

dir [name]: The dir command is used to obtain a list of directory entries or a list of files in a file group on the remote host, or a list of the members of the partitioned data set, as well as auxiliary information about the files.

cd directory: The cd command is used to change the working directory or file group on the remote host.

close: The close command is used to terminate the connection to a remote server.

quit: The quit command is used to disconnect from the remote host and end the client.

Characteristics of Multi-Path Computer Systems

Figure 12:
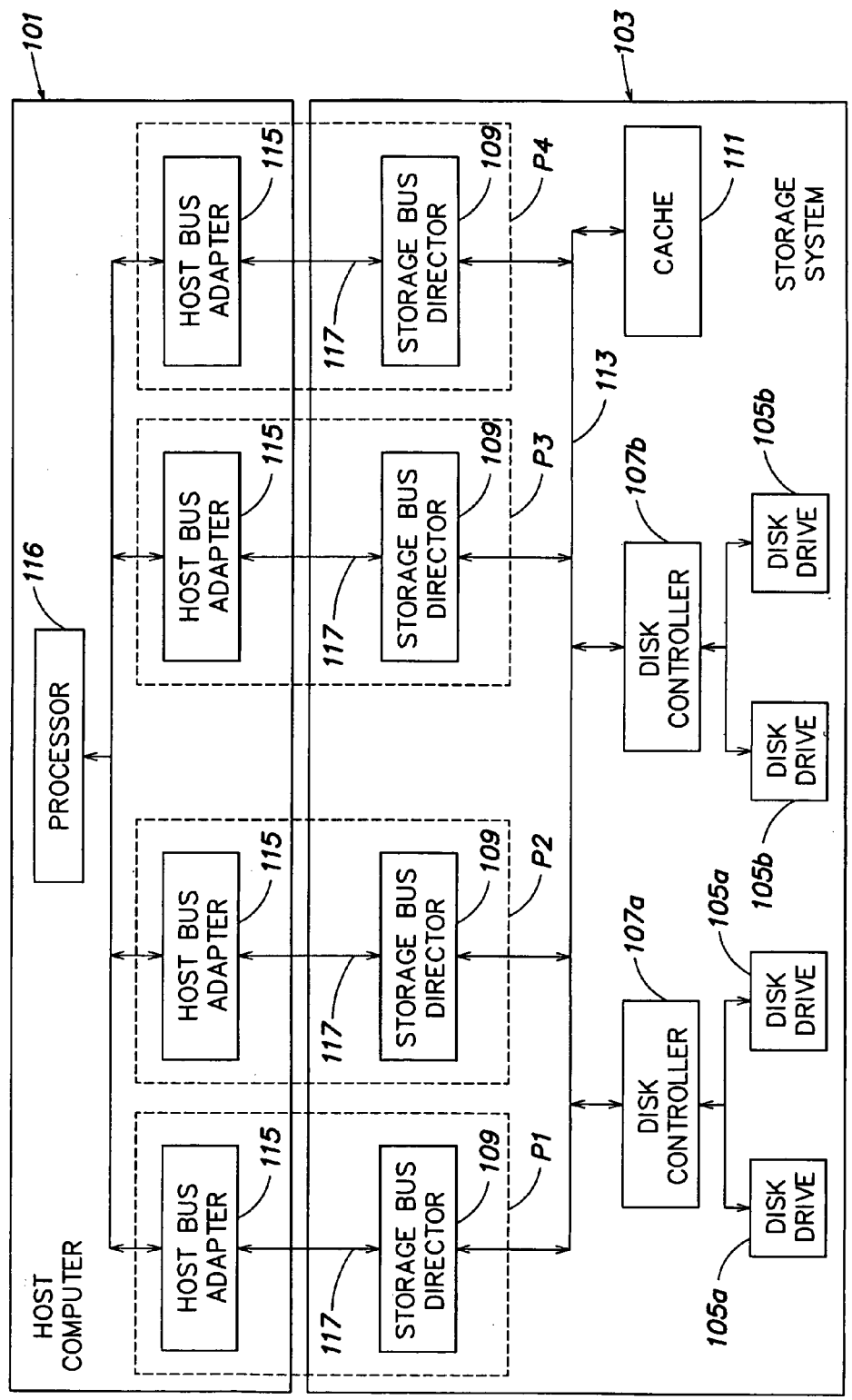
FIG. 12 is a block diagram of an exemplary multi-path computing system on which aspects of the present invention can be implemented.

An example of a multi-path computer system is shown in FIG. 12, which illustrates a single host computer 101 coupled to a storage system 103. The storage system 103 includes a plurality of disk drives 105a–b, and a plurality of disk controllers 107a–b that respectively control access to the disk drives 105a and 105b. The storage system 103 further includes a plurality of storage bus directors 109 at control communication with the host computer 101 over communication buses 117. The storage system 103 further includes a cache 111 to provide improved storage system performance. Finally, the storage system 103 includes an internal bus 113 over which the storage bus directors 109, disk controllers 107a–b and the cache 111 communicate. The storage system 103 is essentially identical to the data storage system 14 shown in FIG. 2, with the disk controller 107a–b performing the functions of the disk adapter 34 and disk director 36, and the storage bus director 109 performing the functions of the channel adapter 30 and the channel director 32.

The host computer 101 includes a processor 116 and one or more host bus adapters 115 that each controls communication between the processor 116 and the storage system 103 via a corresponding one of the communication buses 117. It should be appreciated that rather than a single processor 116, the host computer 101 can include multiple processors. Each bus 117 can be any of a number of different types of communication links, with the host bus adapter 115 and the storage bus directors 109 being adapted to communicate using an appropriate protocol for the bus 117 coupled between them. For example, each of the communication buses 117 can be implemented as a SCSI bus, with the directors 109 and adapters 115 each being a SCSI driver. Alternatively, communication between the host computer 101 and the storage system 103 can be performed over a Fibre Channel fabric.

The multi-path system shown in FIG. 12 includes multiple paths P1–P4 for communicating between the host computer 101 and the storage system 103, with each path including a host bus adapter 115, a bus 117 and a storage bus director 109. Each of the host bus adapters 115 may have the ability to access each of the disk drives 105a–b through the appropriate storage bus director 109 and disk controller 107a–b. As discussed above, providing such multi-path capabilities can enhance system performance, and increase the fault tolerance of the system.

The provision of multiple paths between the host computer 101 and the storage system 103 results in increased system complexity. For example, the operating system on conventional host computers 101 will not recognize that multiple paths have been formed to the same storage device within the storage system. Referring to the illustrative system of FIG. 12, the operating system on the host computer 101 will view the storage system 103 as having four times the number of disk drives 105a–b, since four separate paths are provided to each of the disk drives. To address this problem, conventional host computers have, as explained below, included an additional mapping layer, below the file system or logical volume manager (LVM), to reduce the number of storage devices (e.g., disk drives 105a–b) visible at the application layer to the number of storage devices that actually exist on the storage system 103.

Figure 13:
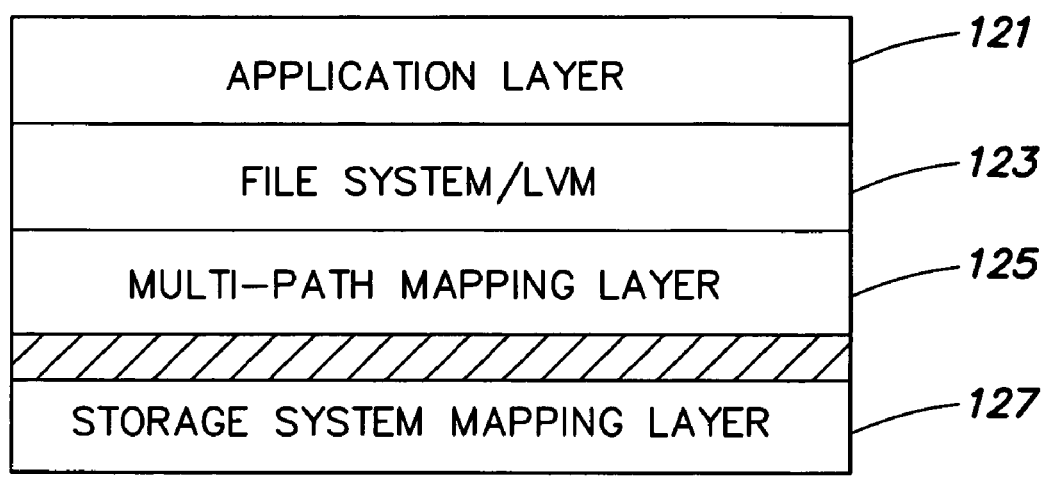
FIG. 13 is a schematic representation of a number of mapping layers that exist in a multi-path computing system.

FIG. 13 is a schematic representation of a number of mapping layers that may exist in a known multi-path computer system such as the one shown in FIG. 12. The system includes an application layer 121 which includes application programs executing on the processor 116 of the host computer 101. The application layer 121 will generally refer to storage locations used thereby with a label or identifier such as a file name, and will have no knowledge about where the file is physically stored on the storage system 103 (FIG. 12). Below the application layer 121 is a file system and/or a logical volume manager (LVM) 123 that maps the label or identifier specified by the application layer 121 to a logical volume that the host computer perceives to correspond directly to a physical device address (e.g., the address of one of the disk drives 105a–b) within the storage system 103. Below the file system/LVM layer 123 is a multi-path mapping layer 125 that maps the logical volume address specified by the file system/LVM layer 123, through a particular one of the multiple system paths, to the logical volume address to be presented to the storage system 103. Thus, the multi-path mapping layer 125 not only specifies a particular logical volume address, but also specifies a particular one of the multiple system paths to access the specified logical volume.

If the storage system 103 were not an intelligent storage system, the logical volume address specified by the multipathing layer 125 would identify a particular physical device (e.g., one of disk drives 105a–b) within the storage system 103. However, for an intelligent storage system such as that shown in FIG. 12, the storage system itself may include a further mapping layer 127, such that the logical volume address passed from the host computer 101 may not correspond directly to an actual physical device (e.g., a disk drive 105a–b) on the storage system 103. Rather, a logical volume specified by the host computer 101 can be spread across multiple physical storage devices (e.g., disk drives 105a–b), or multiple logical volumes accessed by the host computer 101 can be stored on a single physical storage device.

It should be appreciated from the foregoing that the multi-path mapping layer 125 performs two functions. First, it controls which of the multiple system paths is used for each access by the host computer 101 to a logical volume. Second, the multi-path mapping layer 125 also reduces the number of logical volumes visible to the file system/LVM layer 123. In particular, for a system including X paths between the host computer 101 and the storage system 103, and Y logical volumes defined on the storage system 103, the host bus adapters 115 see X times Y logical volumes. However, the multi-path mapping layer 125 reduces the number of logical volumes made visible to the file system/LVM layer 123 to equal only the Y distinct logical volumes that actually exist on the storage system 103.

In a known multi-path system as described above in connection with FIGS. 12–13, the operating system executing on the processor 116 in the host computer 101 is required to manage (e.g., at the multi-path mapping layer 125) a number of logical volumes that is equal to the number of logical volumes that the host computer 101 would perceive the storage system 103 as storing if multi-pathing where not employed (Y in the example above), multiplied by the number of paths (e.g., X in the example above and four in FIG. 12) between the host computer 101 and the storage system 103. Referring to the illustrative system of FIG. 12, assuming the storage system 103 includes a total of twenty disk drives 105a–b that each corresponds directly to a single logical volume, and the four paths 117 between the host computer 101 and the storage system 103, the operating system on the processor 116 would need to manage eighty logical volumes. In this respect, a unique label is generated for each independent path to a logical volume. Thus, for each of the twenty logical volumes present on the storage system 103, four unique labels will be generated, each specifying a different path (e.g., through an adapter 115, a bus 117 and a director 109) to the logical volume. These unique labels are used during multi-path operations to identify through which path an operation on the host computer 101 directed to a particular logical volume is to be executed.

Figure 14:
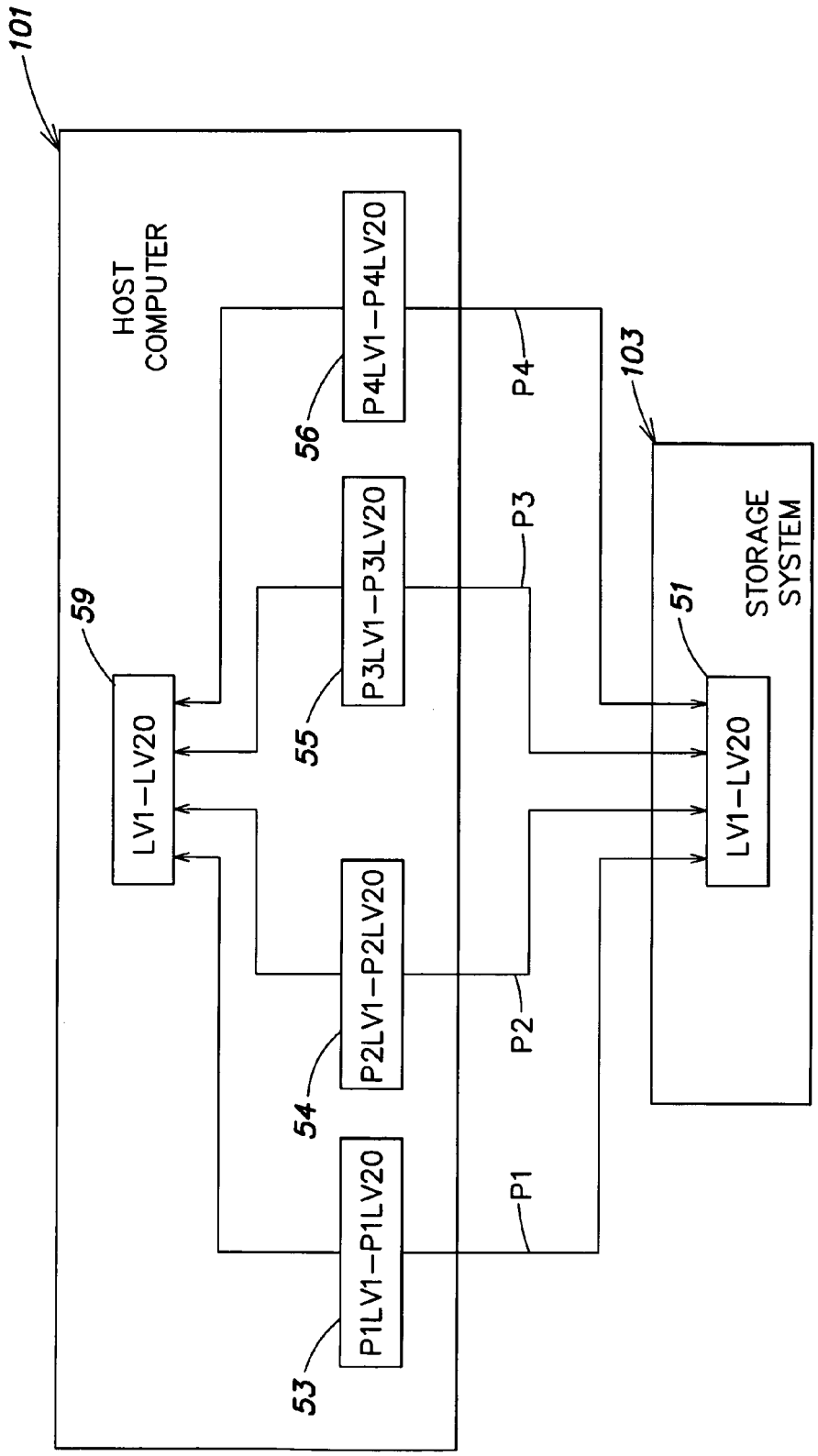
FIG. 14 is a conceptual illustration of the manner in which logical volumes are managed in a multi-path computing system.

FIG. 14 is a conceptual representation of the manner in which complexity is introduced into the host computer 101 due to the use of multiple paths P1–P4. In the example shown in FIG. 14, the storage system 103 includes twenty logical volumes 51, labeled LV1–LV20. As shown in FIG. 14, the host computer 101 includes four separate groups of labels 53–56 for each group of logical volumes LV1–LV20. These groups of labels are identified as P1LV1–P1LV20, P2LV1–P2LV20, P3LV1–P3LV20 and P4LV1–P4LV20 to indicate that there are four separate paths (i.e., P1–P4) to each of the groups of logical volumes LV1–LV20. Finally, as shown in FIG. 14, the multi-path mapping layer 125 (FIG. 13) consolidates the four groups of labels 53–56 to represent only the twenty unique logical volumes LV1–LV20 at 59, so that the file system/LVM layer 123 sees the correct number of logical volumes actually present on the storage system 103. An example of the manner in which the storage system 103 and the multi-path mapping layer 125 can be implemented to achieve the representation of the unique logical volumes LV 1–LV20 at 59 to the file system/LVM layer 123 is described in commonly-assigned U.S. patent application Ser. No. 09/107,617, entitled METHOD AND APPARATUS FOR MANAGING VIRTUAL STORAGE DEVICES IN A STORAGE SYSTEM, filed Jun. 30, 1998, which is hereby incorporated herein by reference.

Although the majority of applications running on the host computer 101 need not be cognizant of the unique labels available for each independent path to a logical volume, some utilities and perhaps application programs will perform path specific operations, and as such, will require access to the groups of labels 53–56 that identify each of the logical volumes over the specific paths through which they are accessible (e.g., labels P1LV1–P1LV20, P2LV1–P2LV20, P3LV1–P3LV20 and P4LV1–P4LV20 in FIG. 14). Typically, such uses will be for reasons other than reading and writing data from a logical volume, so that they will be outside of the regular read/write path, and will typically relate to control functions. Most operating systems provide commands to deal with such functions. For example, in UNIX, a set of IOCTL (for I/O control) commands are provided which can be used to perform such functions, and are implemented at a low level as port-to-port communication. For example, in UNIX, the standard way for the host, computer 101 to specify access to a particular device (e.g., one of the disk drives 105*a–b*) on the storage system 103 is to provide a device name of a form such as /dev/$c_x t_y d_z$, where each of x, y and z is a number. In this respect, x is a number uniquely identifying a controller on the host computer 101 (e.g., a host bus adapter 115 in FIG. 12) that identifies the particular port on the host computer to be used for the access, y is a number uniquely identifying a target device (e.g., a storage bus director 109 in FIG. 12) which in turn identifies the particular port on the storage system 103 through which the target device is accessed, and z is a number uniquely identifying the one of the disks (e.g., one of disk drives 105*a–b*) that is accessible to the target storage bus director and is the target of the command. Thus, the syntax for an IOCTL command is to specify the device to be accessed using this UNIX convention, such that the instruction specifies not only a target device, but also a particular path for accessing that target device. Because they employ a syntax that requires that a particular path be specified, IOCTL commands can be employed to perform certain control functions that are path specific. Examples of the types of functions performed by IOCTL commands supported by UNIX include the formatting of a disk drive, the partitioning of a disk drive into subdivisions, etc.

Implementation of FTS on a Multi-Path System

In the particular implementation of FTS discussed above, the actual reading and writing of data to the shared storage buffer is accomplished using the get source_file target_file and put source_file target_file commands. The get and put commands are implemented in UNIX using lower level IOCTL commands. In this respect, it should be appreciated that the get and put commands operate on files, and are outside of the normal read/write path of the system. In this respect, conventional reads and writes are performed based upon a modulo of a particular number of bytes (e.g., 512 bytes). By contrast, the get and put commands used by FTS are not constrained to operate on segments of any particular number of bytes, but rather, move exactly the number of bytes included in the subject file. In addition, conventional reads and writes are typically limited to a particular size (e.g., 8 k), whereas the get and put commands used to implement FTS in the manner discussed above are not so constrained, and therefore, can move larger units of data to operate more efficiently. In addition, using get and put commands that provide exactly the number of bytes to be moved facilitates the use of the polling techniques employed in the above-described implementation of FTS, as no special commands need be provided to specify whether or not a portion of transferred data includes valid data.

In the above-described implementation of FTS in a multi-path system, the multi-path mapping layer 125 is adapted to simply pass any IOCTL command that it receives through to the particular target address specified therein, such that the command will be executed over the particular one of the multiple paths P1–P4 (FIG. 12) specified by the IOCTL command. The mapping layer 125 operates in this manner to respect the path-specific nature of the IOCTL commands. In the implementation of FTS discussed above, the service console 50 is employed to enable a user (e.g., a system administrator) to configure the volumes within the storage system 103, such that at least one volume serves as the shared memory 15 (FIG. 2). In a multi-path system, the system administrator will also specify the particular host bus adapter 115 and storage bus director 109 through which the shared volume is to be accessed, thereby defining one of the multiple paths P1–P4 (FIG. 12) that the IOCTL command is to specify when reading data from and writing data to the shared volume. Thus, during the execution of the above-discussed implementation of FTS in a multi-path system, the multi-path mapping layer 125 will pass through the IOCTL commands that implement the get and put commands that move the data.

Employing Multiple Paths for FTS Data Transfers

In accordance with one illustrative embodiment of the present invention, a method and apparatus is provided for using multiple paths to access a shared buffer in a file transfer utility. Although described below for use with the specific implementation of FTS discussed above, it should be appreciated that the present invention is not limited in this respect, and that it can be used with any file transfer utility that employs a shared buffer. For example, the aspects of the present invention described below are not limited to use with a disk drive storage system, nor to employing a data system cache for implementing the shared buffer, as numerous other types of data storage systems can be employed to implement the shared buffer, such that the data storage system can constitute any type of data storage media. In addition, the present invention is not limited to employing get and put commands to implement the data transfer to and from the shared buffer, nor to employing IOCTL commands to implement the same.

It should be appreciated that the method and apparatus of the present invention can employ multiple paths for accessing the shared memory from either or both of the host processors 12 (see FIGS. 1–3), including the host processor on which the initiator process is running and/or the host processor on which the connector process is running. Similarly, multiple paths can be used to access the shared memory from the host processor 12 that writes data from the source file to the shared memory, and/or from the host processor that reads data from the shared memory to the target file.

Furthermore, the method and apparatus of the present invention can employ multiple paths for communicating between the shared memory and one or more of the host processors 12 for any purpose. For example, multiple paths can be used for accessing the shared volume for fault tolerance reasons. Providing multiple paths between one of the host processors 12 and the shared memory (e.g., 15 in FIG. 1) ensures that the file transfer capability will not be lost if a problem is experienced with one of the multiple paths P1–P4 (FIG. 12). In this respect, if only a single path were dedicated to providing communication with the shared memory, then if problems are experienced with the dedicated path, the file transfer utility will be lost until such time as the problem is corrected, or a system administrator reconfigures the system to specify a different path for accessing the shared memory.

In accordance with one embodiment of the present invention, multiple paths are employed for providing communication between the host computer 101 (FIG. 12) and the shared memory (e.g., in the storage system 103), so that if a problem is experienced with one of the paths, the file transfer utility will automatically continue to be supported by one of the remaining paths in the system, without requiring any reconfiguration by a system administrator.

Another embodiment of the present invention is directed to employing multiple paths for communication between a host processor and the shared memory to enhance system performance. In this embodiment, multiple communication operations between the host computer and the shared memory can be performed simultaneously over different paths. Such multiple communication operations can be any of numerous types. For example, for a particular instance of a file transfer utility executing on the host processor, the information transferred between the host computer 101 (FIG. 12) and the shared memory (e.g., in storage system 103) can include multiple components, and the multi-path capability in accordance with one embodiment of the present invention can enable different components of the information to be transferred simultaneously (over different paths) between the host processor 101 and the shared memory. Alternatively, multiple instances of a file transfer utility can be executing simultaneously on the host processor 101, and each instance can use a different one of the multiple paths to communicate between the host computer 101 and the shared memory. Finally, different file transfer utilities can be provided on the host computer 101 that each accesses a shared region within a data storage system (e.g., the storage system 103 in FIG. 12), and each file transfer utility can use a different path to access the shared storage region.

As should be appreciated from the foregoing, the embodiment of the present invention directed to employing multiple paths for enabling communication between a host computer 101 and a shared memory in a file transfer utility can be used to support numerous types of multi-path communication, as this embodiment is not limited to any particular form of communication.

In a further embodiment of the present invention, load balancing techniques can be employed to select an appropriate one of the multiple paths available for performing each transfer between the shared memory and the host processor to increase system performance. Any of numerous load balancing techniques can be employed, as in the broadest sense, the present invention is not limited to employing any particular path selection criteria. However, in one embodiment of the present invention, the load balancing techniques employed are those disclosed in commonly-assigned U.S. patent application Ser. No. 09/223,998, entitled METHOD AND APPARATUS FOR BALANCING WORKLOADS AMONG PATHS IN A MULTI-PATH COMPUTER SYSTEM, filed Dec. 31, 1998, which is hereby incorporated herein by reference (hereafter "the Load Balancing application). The Load Balancing application discloses a number of particularly effective load balancing techniques that could significantly improve the performance of the above-described FTS file transfer utility. In this respect, the read and write commands used to move data to and from the shared memory can either be treated as normal operations, or can be given a higher priority in the manner specified in the Load Balancing application. Again, although the particular load balancing techniques disclosed in the Load Balancing application are advantageous, it should be appreciated that the present invention is not limited to using these or any other load balancing techniques.

In one embodiment of the present invention, the multi-pathing of IOCTL commands directed to reading data from and writing data to the shared buffer is implemented by the multi-path mapping layer 125 (FIG. 13). In this respect, in one embodiment of the present invention, the multi-path mapping layer recognizes any IOCTL command that reads or writes data as not being restricted to a particular path, and treats such IOCTL commands like other read or write commands in the sense that the multi-path mapping layer 125 may select (e.g., using load balancing techniques as discussed above) any one of the multiple paths in the computer system for servicing the IOCTL read or write command by transferring the command and the data it accesses over the selected path. However, it should be appreciated that the present invention is not limited to this particular implementation, as numerous other implementations are possible. For example, the multi-path mapping layer 125 can be implemented so that it does not make multiple paths available to every IOCTL read/write command, but rather, specifically identifies only those IOCTL read/write commands that are directed to the shared memory for such multi-path treatment. Furthermore, the aspect of the present invention related to making multiple paths available for IOCTL read and/or write commands directed to the shared buffer can be implemented in other ways, rather than in the multi-path mapping layer 125.

Figure 16:
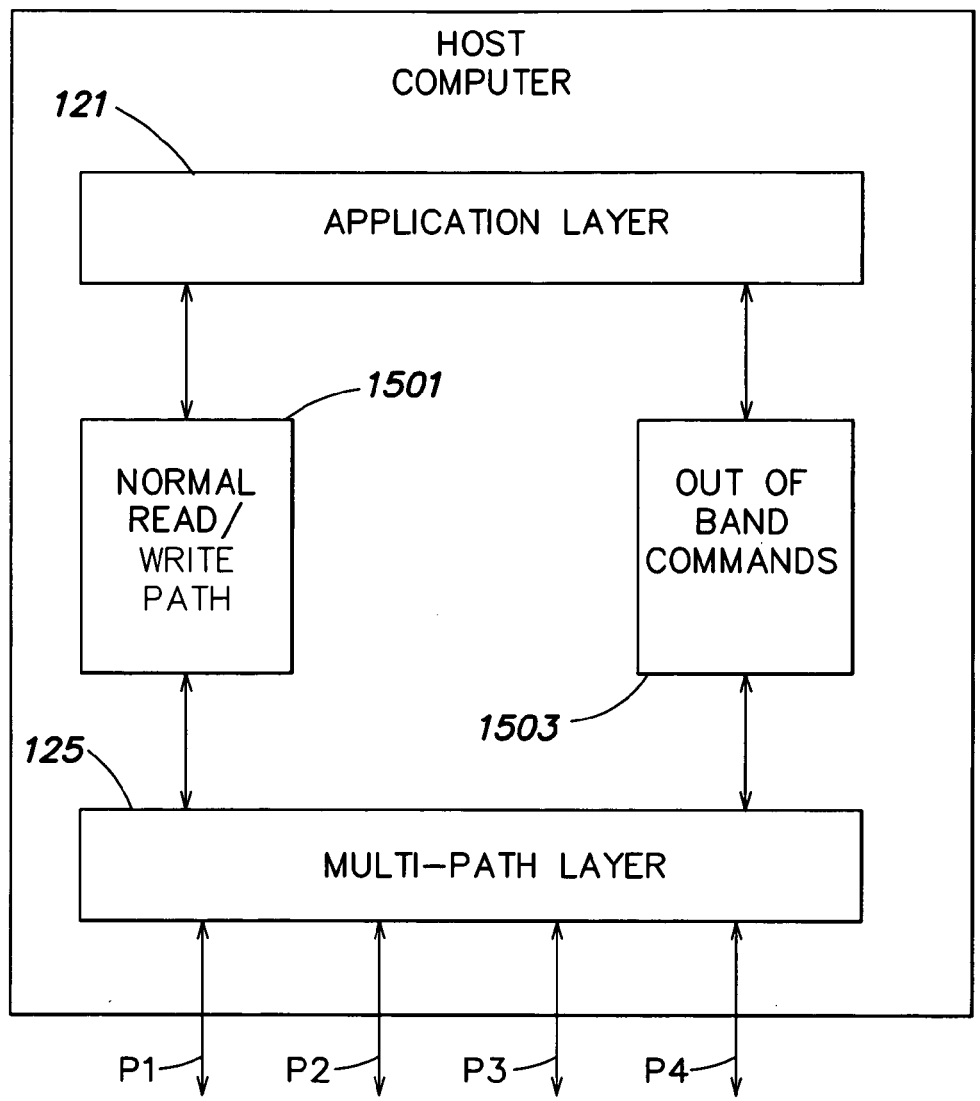
FIG. 16 is a conceptual illustration of out of band commands that do not pass through the normal read/write path in a host computer.

The above-described implementation according to one embodiment of the present invention is illustrated in FIG. 16, which conceptually illustrates a host computer. The host computer includes an application layer 121 (see also FIG. 13) and a multi-path mapping layer 125 that can select between any of four paths P1–P4. The host computer includes a normal read/write path 1501 that handles normal read and write operations. In addition, out of band commands do not pass through the normal read/write path, as conceptually shown at 1503. As discussed above, in one embodiment of the present invention, the multi-path mapping layer 125 may recognize out of band commands as not being restricted to a particular path.

Figure 15:
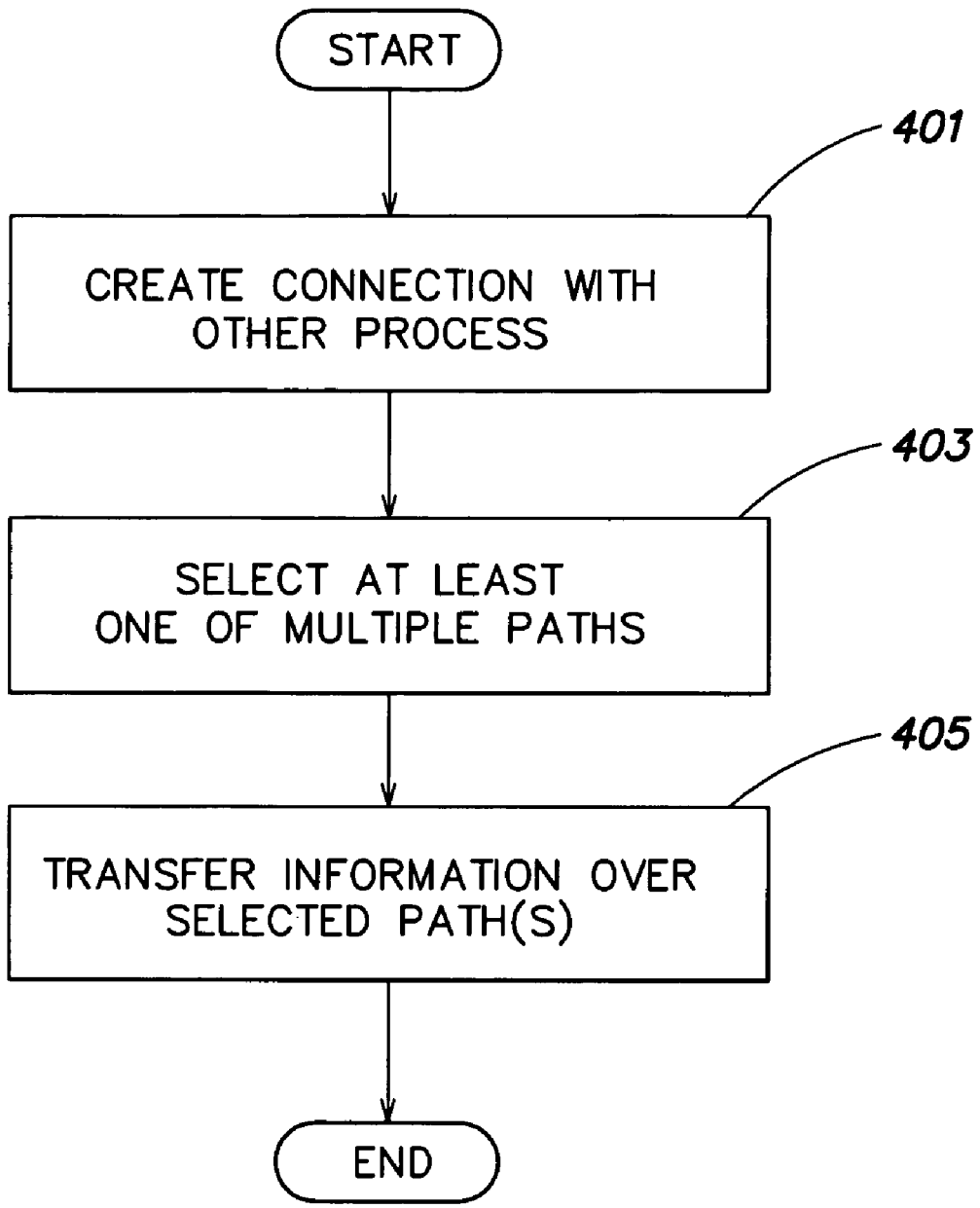
FIG. 15 is a flow chart of the steps performed during execution of a file transfer utility employing the multi-path capability in accordance with one embodiment of the present invention.

An example of a method of executing a file transfer utility using the multi-path capability of the present invention is shown in FIG. 15, making reference to FIG. 3. The method shown in FIG. 15 can, for example, be executed on the host processor 12 that includes the server 72. Initially, in step 401, the host processor 12 creates a connection with a process executing on the other host processor in the system, i.e., the host processor that includes server 74. Although the present invention is not limited to creating this connection in any particular manner, one illustrative example is described above in connection with FTS. Next, in step 403, at least one of multiple paths P1 and P2 is selected for transferring information between the server 72 and the shared stored region in the cache 22. As mentioned above, this selection process can be done in any of numerous ways (e.g., using a load balancing algorithm), as the present invention is not limited to the use of any particular selection criteria. Finally, in step 405, the server 72 transfers information between the source file 78 and the shared stored region in the cache 22 using the one or more paths selected in step 403.

Although the method shown in FIG. 15 is executed on a host processor that writes data from the source file 78 to the shared memory, it should be appreciated that such a method can also be executed on the host processor that is associated with the server 74 that writes data from the shared memory to the target file 76. In addition, the step 401 can include creating a connection from either the initiator process or the connector process as discussed above.

An alternate embodiment of the present invention is not specifically directed to a file transfer utility as discussed above. In this respect, Applicants have appreciated that there are other applications in which out of band control commands (such as IOCTL commands) are employed that need not be limited to execution over a specific path, and that would benefit from using multiple paths in a multi-path system. In this respect, out of band control commands are to be distinguished from in-band communication commands, which pass through the normal read/write data path of the system. Most computer systems also include out of band commands, which bypass one or more of the layers in the normal read/write data path. IOCTL commands are an example of an out of band control command in UNIX, and similar commands are provided in other operating systems. As should be appreciated from the discussion above relating to the manner in which the get and put commands are implemented using IOCTL commands, out of band control commands can be associated not only with control functions such as formatting or partitioning a disc drive as discussed above, but can also access (i.e., read and write) data, outside of the normal read/write path of the system. As discussed above, the get and put commands are implemented using IOCTL commands that perform read and write operations but are not limited to acting upon a modulo of a particular number of bytes, such that they are executed outside of the normal read/write path. Thus, as used herein, the term "out of band control command" refers to any control command outside of the normal read/write path of the system, which can include commands that implement control functions, as well as those that perform read or write operations outside of the normal read/write path.

In view of the foregoing, one aspect of the present invention is not limited to use in a file transfer utility, but is more broadly directed to a method and apparatus for employing multiple paths for processing out of band control commands. Stated differently, this aspect of the present invention is directed to a method and apparatus for selecting a path for transmitting an out of band control command that specifies a particular target path in a multi-path computer system, so that the out of band control command may be processed over a different path, without being constrained to the target path specified by the command itself. Of course, the out of band control command can still be transmitted over the target path if doing so meets the selection criteria used to determine which of the multiple paths should be employed (e.g., for load balancing reasons). This selection process can be done automatically by the host computer, without requiring intervention by a system administrator. As discussed above, one application for this aspect of the present invention is for out of band control commands that read and/or write data. However, this aspect of the present invention is not limited in this respect, and can be employed with other types of out of band control commands that are not restricted to use over a particular path, and that can benefit from the use of multiple paths that couple together a host computer on which the out of band control command executes and any other type of computer device to which the out of band control commands are directed.

As mentioned above, the multi-path aspects of the present invention can be implemented in any of numerous ways, as the present invention is not limited to any particular manner of implementation. In one embodiment, the multi-path aspects of the present invention are implemented in the multi-path mapping layer 125, which itself can be implemented in numerous ways. For example, the multi-path mapping layer can be implemented in software that is stored in a memory (not shown) in the host computer 101 (FIG. 12), and is executed either on the processor 116 or a dedicated processor in the host computer 101. In one embodiment, the mapping layer 125 is implemented in the host bus adapters 115, which each can include a, processor (not shown) that can execute software or firmware to implement the mapping layer 125. In this respect, it should be appreciated that both the processor 116 and the host bus adapters 115 can be generically considered as controllers, such that the host computer 101 can be provided with at least one controller to perform the multi-path functions described above. These functions can be performed by a single controller, or can be distributed amongst multiple controllers (e.g., the host bus adapters 115).

The controllers (e.g., host bus adapters 115) that perform the above-described aspects of the present invention can be implemented in numerous ways, such as with dedicated hardware, or using a processor that is programmed using microcode or software to perform the functions recited above. In this respect, it should be appreciated that one implementation of the present invention comprises a computer readable medium (e.g., a computer memory, a floppy disk, a compact disc, a tape, etc.) encoded with a computer program that, when executed on a processor, performs the above-discussed functions of the present invention. The computer readable medium can be transportable, such that the program stored thereon can be loaded onto a computer system to implement the aspects of the present invention discussed above. In addition, it should be appreciated that the reference to a computer program that, when executed, performs the above-discussed functions is not limited to an application program running in application space on the host computer. Rather, the term computer program is used herein in a generic sense to reference any type of computer code (e.g., software or microcode) that can be employed to program a processor to implement the above-discussed aspects of the present invention.

Having described several embodiments of the invention in detail, various modifications and improvements will readily occur to those skilled in the art. Such modifications and improvements were intended to be within the spirit and scope of the invention. Accordingly, the foregoing description is by way of example only, and is not intended as limiting. The invention is limited only as defined by the following claims and the equivalents thereto.

What is claimed is:

1. A method of processing an out of band control command executed by a host computer in a multi-path system including the host computer, a device and multiple physical paths coupling the host computer to the device, the out of band control command identifying a target address in the device and bypassing at least one layer in a normal read/write path in the host computer, the out of band control command further identifying, from among the multiple physical paths, a target physical path for transmission of the out of band control command between the host computer and the device, the host computer comprising a plurality of adapters each adapted to interface the host computer to one of the multiple physical paths, the method comprising steps of:

(A) selecting a selected physical path for transmitting out of band control command between the host computer and the device, the selected physical path being selected from among the multiple physical paths based upon a selection criteria that enables the selected physical path to be other than the target physical path identified by the out of band control command; and (B) transmitting the out of band control command through the one of the plurality of adapters corresponding to the selected path to the device over the selected physical path.

2. The method of claim 1, wherein the device is a data storage system, wherein the out of band control command requests access to information stored on the data storage system, and wherein the step (B) includes a step of transmitting the information between the host computer and the data storage system over the selected physical path.

3. The method of claim 2, wherein the multi-path system further includes a second computer that is coupled to the data storage system, wherein the data storage system includes a shared storage region shared by the host computer and the second computer, wherein the target address specifies the shared storage region, and wherein the step (B) includes a step of transmitting the information between the host computer and the shared storage region over the selected physical path.

4. The method of clam 1, wherein the step (A) includes a step of selecting the target physical path as the selected physical path when the target physical path is operational, and selecting a different one of the multiple physical paths as the selected physical path when the target physical path is non-operational.

5. The method of claim 4, wherein the step (A) further includes a step of automatically selecting the different one of the multiple physical paths when the target physical path is non-operational, without intervention of a system administrator.

6. The method of claim 1, wherein the step (A) includes a step of selecting the selected physical path based upon a selection algorithm that distributes, among the multiple physical paths a load of operations passing between the host computer and the device.

7. The method of claim 1, wherein the step (A) includes a step of selecting the selected physical path based upon a state of previously assigned operations queued for transmission from the host computer to the device over the multiple physical paths.

8. A computer readable medium encoded with a program for execution on a host computer in a multi-path system including the host computer, a device and multiple physical paths coupling the host computer to the device, wherein the host computer executes an out of band control command identifying a target address in the device and bypassing at least one layer in a normal read/write path in the host computer, the out of band control command further identifying, from among the multiple physical paths, a target physical path for transmission of the out of band control command between the host computer and the device, the host computer comprising a plurality of adapters each adapted to interface the host computer to one of the multiple physical paths, the program when executed on the host computer, performs a method comprising steps of:

(A) selecting a physical path for transmitting the out of band control command between the host computer and the device, the selected physical path being selected from among the multiple physical paths based upon a selection criteria that enables the selected physical path to be other than the target physical path identified by the out of band control command; and (B) transmitting the out of band control command through the one of the plurality of adapters corresponding to the selected path to the device over the selected physical path.

9. The computer readable medium of claim 8, wherein the device is a data storage system, wherein the out of band control command requests access to information stored on the data storage system, and wherein the step (B) includes a step of transmitting the information between the host computer and the data storage system over the selected physical path.

10. The computer readable medium of claim 9, wherein the multi-path system further includes a second computer that is coupled to the data storage system, wherein the data storage system includes a shared storage region shared by the host computer and the second computer, wherein the target address specifies the shared storage region, and wherein the step (B) includes a step of transmitting the information between the host computer and the shared storage region over the selected physical path.

11. The computer readable medium of claim 8, wherein the step (A) includes a step of selecting the target physical path as the selected physical path when the target physical path is operational, and selecting a different one of the multiple physical paths as the selected physical path when the target physical path is non-operational.

12. The computer readable medium of claim 11, wherein the step (A) further includes a step of automatically selecting the different one of the multiple physical paths when the target physical path is non-operational, without intervention of a system administrator.

13. The computer readable medium of claim 8, wherein the step (A) includes a step of selecting the selected physical path based upon a selection algorithm that distributes, among the multiple physical paths, a load of operations passing between the host computer and the device.

14. The computer readable medium of claim 8, wherein the step (A) includes a step of selecting the selected physical path based upon a state of previously assigned operations queued for transmission from the host computer to the device over the multiple physical paths.

15. A host computer for use in a multi-path system including the host computer, a device and multiple physical paths coupling the host computer to the device, the host computer comprising:

at least one processor to execute an out of band control command identifying a target address in the device and bypassing at least one layer in a normal read/write path in the host computer, the out of band control command further identifying, from among the multiple physical paths, a target physical path for transmission of the out of band control command between the host computer and the device;

a plurality of adapters each adapted to interface the host computer to one of the multiple physical paths; and at least one controller that:

selects a selected physical path for transmitting the out of band control command between the host computer and the device, the selected physical path being selected form among the multiple physical paths based upon a selection criteria that enables the selected physical path to be other than the target physical path identified by the out of band control command; and transmits the out of band control through the one of the plurality of adapters corresponding to the selected path to the device over the selected physical path.

16. The host computer of claim 15, wherein the device is a data storage system, wherein the out of band control command requests access to information stored on the data storage system, and wherein the at least one controller transmits the information between the host computer and the data storage system over the selected physical path.

17. The host computer of claim 16, wherein the multi-path system further includes a second computer that is coupled to the data storage system, wherein the data storage system includes a shared storage region shared by the host computer and the second computer, wherein the target address specifies the shared region, and wherein the at least one controller transmits the information between the host computer and the shared storage region over the selected physical path.

18. The host computer of claim 15, wherein the at least one controller selects the target physical path as the selected physical path when the target physical path is operational, and selects a different one of the multiple physical paths as the selected path when the target physical path is non-operational.

19. The host computer of claim 18, wherein the at least one controller automatically selects the different one of the multiple physical paths when the target physical path is non-operational, without intervention of a system administrator.

20. The host computer of claim 15, wherein the at least one controller selects the selected physical path based upon a selection algorithm that distributes, among the multiple physical paths, a load of operations passing between the host computer and the device.

21. The host computer of claim 15, wherein the at least one controller selects the selected physical path based upon a state of previously assigned operations queued for transmission from the host computer to the device over the multiple physical paths.

22. The host computer of claim 15, wherein the at least one controller includes:

means for selecting a selected physical path for transmitting the out of band control command between the host computer and the device, the selected physical path being selected from among the multiple physical paths based upon a selection criteria that enables the selected physical path to be other than the target physical path identified by the out of band control command; and means for transmitting the out of band control command between the host computer and the device over the selected physical path.

\* \* \* \* \*